(12) United States Patent
Cregan

(10) Patent No.: US 10,459,598 B2
(45) Date of Patent: Oct. 29, 2019

(54) SYSTEMS AND METHODS FOR MANIPULATING A 3D MODEL

(71) Applicant: MappedIn Inc., Kitchener (CA)

(72) Inventor: Zachary Sean Cregan, Kitchener (CA)

(73) Assignee: MAPPEDIN INC., Waterloo (CA)

( * ) Notice: Subject to any disclaimer, the term of this patent is extended or adjusted under 35 U.S.C. 154(b) by 67 days.

(21) Appl. No.: 15/877,571

(22) Filed: Jan. 23, 2018

(65) Prior Publication Data

US 2018/0283876 A1 Oct. 4, 2018

Related U.S. Application Data

(60) Provisional application No. 62/479,026, filed on Mar. 30, 2017.

(51) Int. Cl.
| | | |
|---|---|---|
| *G06F 3/0481* | (2013.01) | |
| *G01C 21/20* | (2006.01) | |
| *G06F 3/0484* | (2013.01) | |
| *G06F 3/0488* | (2013.01) | |
| *G06T 17/05* | (2011.01) | |
| *G06T 19/20* | (2011.01) | |

(52) U.S. Cl.
CPC ....... *G06F 3/04815* (2013.01); *G01C 21/206* (2013.01); *G06F 3/0484* (2013.01); *G06F 3/0488* (2013.01); *G06F 3/04845* (2013.01); *G06T 17/05* (2013.01); *G06T 19/20* (2013.01); *G06T 2219/2016* (2013.01)

(58) Field of Classification Search
CPC ....... G06T 17/05; G06T 19/006; G06T 19/20; G06T 2219/2016; G06F 3/048; G06F 3/04815; G06F 3/04845; G06F 3/0488
See application file for complete search history.

(56) References Cited

U.S. PATENT DOCUMENTS

| | | | |
|---|---|---|---|
| 5,861,889 A * | 1/1999 | Wallace | G06F 3/04845 345/619 |
| 9,269,178 B2 | 2/2016 | Piemonte et al. | |
| 2010/0016049 A1* | 1/2010 | Shirakawa | A63F 13/42 463/9 |
| 2013/0321400 A1* | 12/2013 | van Os | G06T 15/005 345/419 |
| 2014/0156186 A1 | 6/2014 | Liu et al. | |
| 2018/0144547 A1* | 5/2018 | Shakib | G06T 19/003 |

* cited by examiner

*Primary Examiner* — Michelle L Sams
(74) *Attorney, Agent, or Firm* — Own Innovation; James W. Hinton

(57) ABSTRACT

There is provided a method and system for manipulating a 3D model displayed on a display. The method includes detecting one or more display engagement events from a user touch input, determining a location of each display engagement event to generate a corresponding display engagement point, capturing virtual camera state information of a virtual camera, generating and storing an model anchor point for each display engagement point, detecting movement of the display engagement point and capturing an updated display engagement point, and generating a transformation matrix including updated virtual camera state information.

18 Claims, 22 Drawing Sheets

SYSTEMS AND METHODS FOR MANIPULATING A 3D MODEL

TECHNICAL FIELD

The embodiments disclosed herein relates to indoor maps, and, in particular to systems and methods for facility wayfinding and for manipulating a 3D model, such as a map, displayed on a device.

INTRODUCTION

Recent advancements in technology have transformed the ways in which people orient themselves and navigate from place to place, i.e., wayfinding. For instance, technologies such as global positioning system (GPS)-enabled devices and map applications have made outdoor wayfinding more convenient and accurate.

However, fewer advancements have been made in technology relating to wayfinding within a facility, i.e., facility wayfinding, where GPS typically is not viable for wayfinding. As a result, usually static physical signs and directories are used for wayfinding within facilities. Such signs and directories are expensive to update and may provide limited wayfinding information.

SUMMARY

Digital mapping may provide some advantages over existing static paper maps. One of these advantages may be the opportunity to consume a 3 dimensional representation of a map which may help provide a more accurate and natural representation of a given real-world space.

In accordance with one broad aspect of the teachings describe herein, a wayfinding system may include a method and system that can allow a user to manipulate a 3D model (such as a 3D map or other 3D objects in a 3D world or scene) using inputs based on a 2D display of the 3D model, such as touch interactions on a 2D touch screen displaying the 3D model.

There is provided a method for manipulating a 3D model displayed on a display. The method includes detecting one or more display engagement events from a user touch input, determining a location of each display engagement event to generate a corresponding display engagement point, capturing virtual camera state information of a virtual camera, generating and storing a model anchor point for each display engagement point, detecting movement of the display engagement point and capturing an updated display engagement point, and generating a transformation matrix including updated virtual camera state information.

There is provided a system for manipulating a 3D model. The system includes a user input configured to detect one or more display engagement events from a user touch input, and detect movement of a display engagement point and capturing an updated display engagement point; and a camera controller configured to determine a location of each display engagement event to generate a corresponding display engagement point, capture virtual camera state information of a virtual camera, generate and store a model anchor point for each display engagement point, and generate a transformation matrix including updated virtual camera state information.

In an aspect, the method and system further includes, where only one display engagement point is provided, constraining traits of the transformation matrix so the transformation is limited to a translation in a x-y plane of a model coordinate system, and where two display engagement points are provided, constraining traits of the transformation matrix so the transformation is limited to a translation in the x, y, and z axis axes of the model coordinate system and rotation about the model coordinate system's z axis.

The virtual camera state information may include virtual camera position and orientation. The virtual camera position may include X, Y, and Z position values, and the virtual camera orientation includes rotation values about the model coordinate system's x, y, and z axes.

The method and system may further include detecting a single user touch input, updating the virtual camera position values X, and Y, and fixing the virtual camera position value Z and the virtual camera orientation.

The method may further include detecting a first user touch input and a second user touch input, updating the virtual camera position values X, Y, Z, the rotation values of the virtual camera orientation about the model coordinate system's Z axis, and fixing the rotation values of the virtual camera orientation about the model coordinate system's X and Y axes.

The method and system may further include displaying a 3D map on a touchscreen display, detecting the display engagement events from a user touch input on the touchscreen display, and displaying, on the touchscreen display, an updated 3D map based on updated virtual camera position and orientation.

The model anchor point may be stored in the model coordinate system, and wherein the display engagement event location may be stored in a display coordinate system.

The method and system may further include applying a hit test algorithm for a given display engagement point and capturing camera state values of the virtual camera when the display engagement point is initially created.

The virtual camera state information may be stored as an affine transform matrix and a non-affine perspective matrix.

The method and system may further include capturing the virtual camera state information at a different time to provide an updated affine transform matrix.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistance, cellular telephone, smartphone, or tablet device.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

Figure 1:
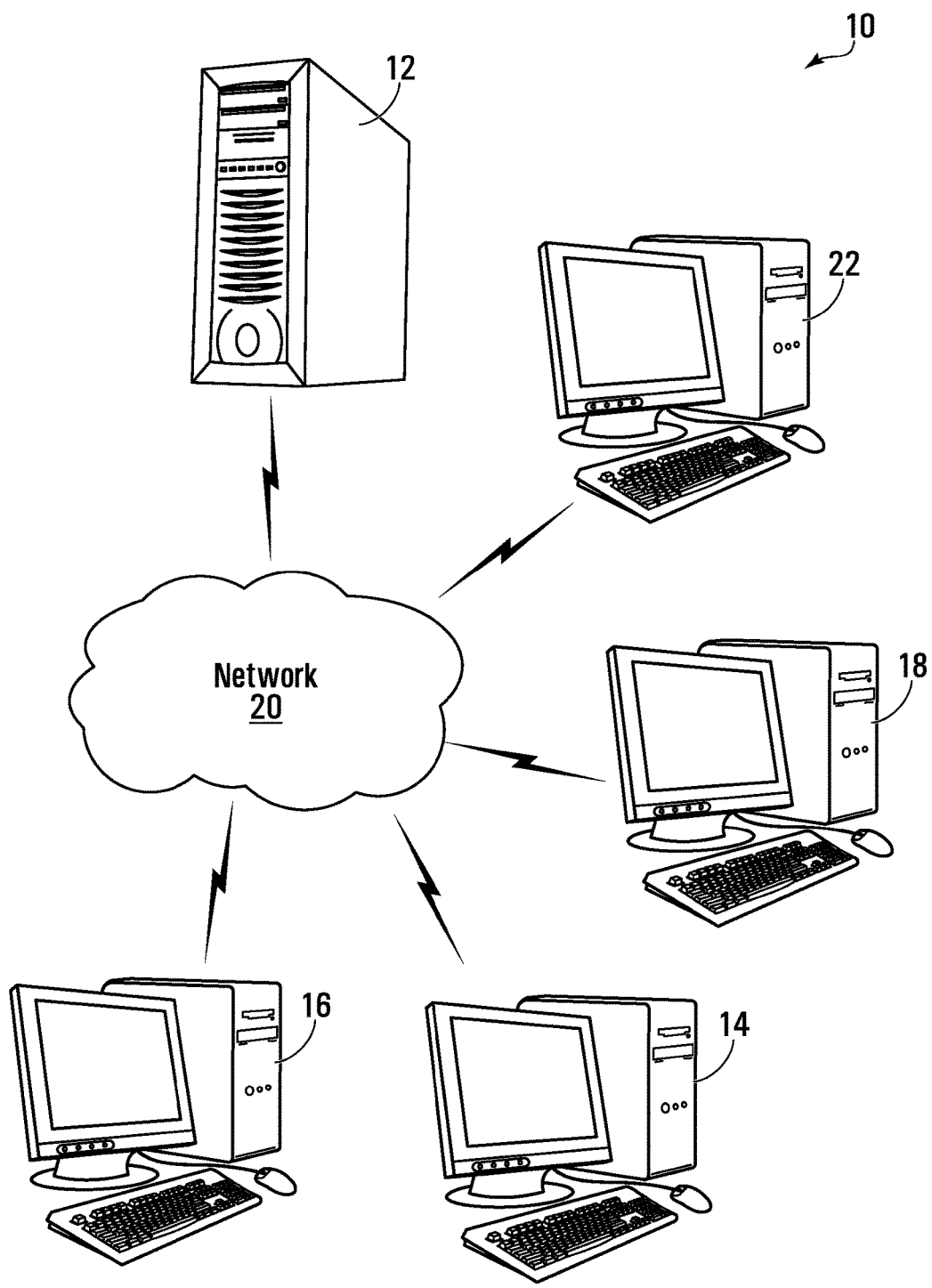
FIG. 1 is a diagram of a wayfinding system, in accordance with an embodiment.

FIG. 1 shows a block diagram illustrating one exemplary embodiment of a wayfinding system 10 for creating maps of a facility. The wayfinding system 10 is for a facility including multiple objects, i.e., a facility wayfinding system. The wayfinding system 10 is not restricted to a single facility, but may be extended to multiple facilities of the same type and/or different types, each including multiple objects. Examples of objects that may be included in a given facility can include facility units, obstructions, connections, regions, wayfinding nodes and the like. For the purposes of this description, facility units may be configured as stores, rooms and other types of identifiable, generally bounded structures that may form a part of a larger facility.

For example, stores within a shopping centre, offices within a commercial office building, classrooms within a school, patient rooms within a hospital, bathrooms inside other structures and the like. Obstructions may be objects that are generally not traversable by the wayfinding system 10 end users and that may tend to impede navigation throughout the facility. Examples of obstructions can include tables, benches, shelfs, beds, other furniture, fountains, sculptures and other objects that are placed within a facility or facility unit but typically do not form part of the structure of the facility or facility unit. Connections may be portions of a facility or facility unit that extend between, and connect, two or more traversable areas within the wayfinding system 10. Examples of connections may include hallways, walkways, staircases, elevators, escalators, ramps, moving walkways and the like. Regions may be regions of the facility and/or a facility unit that are generally open, at least partially traversable areas that are not bounded by walls. Examples of regions can include, atriums, foyers, event spaces, stages, open floor area in a store, concourses, public squares, courtyards and the like. Wayfinding nodes may be objects positioned within a map that are used to help define locations and/or paths for wayfinding purposes, but that do not necessarily correspond to real-world objects. Nodes need not be visible to a system user, but may be displayed in some systems (for example as part of a wayfinding path that is displayed to the user).

Objects in the wayfinding system 10 may be defined and stored in any suitable data and/or file format. Optionally, the objects may be defined as closed polygons, and may be 3D polygons if intended to be used in combination with a facility map or display that can provide 3D models. In some examples, each object may be defined by one or more vertices or points, which when connected together, define the outer boundary of the object. For example, a 3D cube object would include 8 points (i.e. the 8 corner vertices of a cube) that would be recognized and stored by the wayfinding system 10. As another example, a wayfinding node could include 1 or more closely spaced points, a facility unit may include a plurality of points arranged in any suitable configuration to bound the intended facility unit perimeter. Obstructions, connections and other object types can also be defined as a plurality of related points. In this description, the plurality of points defining a given object can be referred to as an object point cloud. Because some types of objects can be nested within other objects (such as a shelf object being positioned within a store object, which itself is positioned within a facility object), the object point clouds associate with such objects may also be nested and/or group together. That is, the object point cloud for a store unit may contain the object point clouds of a plurality of fixtures, wayfinding nodes and the like.

The wayfinding system 10 allows users, e.g., visitors to the facility, to orient themselves and to navigate from place to place within the facility, enabling them to find what they are looking for and to discover things around them. For example, a shopper at a mall can use the wayfinding system to search for a particular store or a particular item or class of items (e.g., shoes), navigate to the relevant location, and/or look at the current promotions.

The facility may be any type of facility, and may include a single building or two or more separate buildings, each of which may include any suitable facility units and other objects. Typically, the facility is a commercial facility or an institutional facility. For example, the facility may be a retail facility, e.g., a mall or a shopping center, an office facility, e.g., an office building, an event facility, e.g., a conference center or a theme park, a transportation facility, e.g., an airport, an educational facility, e.g., a school or a university campus, or a medical facility, e.g., a hospital. The facility may be an indoor or an outdoor facility and/or may include a combination of indoor and outdoor portions. However, the wayfinding systems described herein may be particularly useful for indoor facilities and/or facilities with at least some indoor portions.

The facility units may be any type of facility units, and the facility may include different types of facility units. Typically, the facility units are commonly managed as part of the facility. For example the facility units may be stores, restaurants, booths, offices, rooms, halls, washrooms, airport gates, and/or locations or areas within the facility.

The wayfinding system 10 may include a facility wayfinding system, such as those described in United States Patent Application Publication Number 2014/0156186, application Ser. No. 13/852,304, issued to U.S. Pat. No. 9,702,706 and granted Jul. 11, 2017, which is hereby incorporated by reference in its entirety.

In the illustrated example, the wayfinding system 10 includes a server platform 12 which communicates with a plurality of store devices 14, a plurality of facility devices 16, and a plurality of administrator devices 18 via a network 20. The server platform 12 also communicates with a plurality of visitor devices 22. The server platform 12 may be a purpose built machine designed specifically for implementing a system and method for creating maps of a facility.

The server platform 12, store devices 14, facility devices 16, administrator devices 18 and user devices 22 may be a server computer, desktop computer, notebook computer, tablet, PDA, smartphone, or another computing device. The devices 12, 14, 16, 18, 22 may include a connection with the network 20 such as a wired or wireless connection to the Internet. In some cases, the network 20 may include other types of computer or telecommunication networks. The devices 12, 14, 16, 18, 22 may include one or more of a memory, a secondary storage device, a processor, an input device, a display device, and an output device. Memory may include random access memory (RAM) or similar types of memory. Also, memory may store one or more applications for execution by the processor. Applications may correspond with software modules comprising computer executable instructions to perform processing for the functions described below. Secondary storage devices may include a hard disk drive, floppy disk drive, CD drive, DVD drive, Blu-ray drive, or other types of non-volatile data storage.

The processor may execute applications, computer readable instructions or programs. The applications, computer readable instructions or programs may be stored in memory or in secondary storage, or may be received from the Internet or other network 20. Input device may include any device for entering information into device 12, 14, 16, 18, 22. For example, input device may be a keyboard, key pad, cursor-control device, touch-screen, camera, or microphone. Display device may include any type of device for presenting visual information. For example, display device may be a computer monitor, a flat-screen display, a projector or a display panel. Output device may include any type of device for presenting a hard copy of information, such as a printer for example. Output device may also include other types of output devices such as speakers, for example. In some cases, device 12, 14, 16, 18, 22 may include multiple of any one or more of processors, applications, software modules, second storage devices, network connections, input devices, output devices, and display devices.

Although devices 12, 14, 16, 18, 22 are described with various components, one skilled in the art will appreciate that the devices 12, 14, 16, 18, 22 may in some cases contain fewer, additional or different components. In addition, although aspects of an implementation of the devices 12, 14, 16, 18, 22 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the devices 12, 14, 16, 18, 22 and/or processor to perform a particular method.

In the description that follows, devices such as server platform 12, store devices 14, facility devices 16, administrator devices 18, and visitor devices 22 are described performing certain acts. It will be appreciated that any one or more of these devices may perform an act automatically or in response to an interaction by a user of that device. That is, the user of the device may manipulate one or more input devices (e.g. a touchscreen, a mouse, or a button) causing the device to perform the described act. In many cases, this aspect may not be described below, but it will be understood.

As an example, it is described below that the devices 12, 14, 16, 18, 22 may send information to the server platform 12. For example, a store user using the store device 14 may manipulate one or more input devices (e.g. a mouse and a keyboard) to interact with a user interface displayed on a display of the store device 14 to respond to questions. Generally, the device may receive a user interface from the network 20 (e.g. in the form of a webpage). Alternatively or in addition, a user interface may be stored locally at a device (e.g. a cache of a webpage or a mobile application).

Server platform 12 may be configured to receive a plurality of information, from each of the plurality of store devices 14, facility devices 16, administrator devices 18, and visitor devices 22. Generally, the information may comprise at least an identifier identifying the store, facility, administrator, or visitor. For example, the information may comprise one or more of a username, e-mail address, password, or social media handle.

In response to receiving information, the server platform 12 may store the information in storage database. The storage may correspond with secondary storage of the device 12, 14, 16, 18, 22. Generally, the storage database may be any suitable storage device such as a hard disk drive, a solid state drive, a memory card, or a disk (e.g. CD, DVD, or Blu-ray etc.). Also, the storage database may be locally connected with server platform 12. In some cases, storage database may be located remotely from server platform 12 and accessible to server platform 12 across a network for example. In some cases, storage database may comprise one or more storage devices located at a networked cloud storage provider.

The store device 14 may be associated with a store account. Similarly, the facility device 16 may be associated with a facility account, the administrator device 18 may be associated with an administrator account, and the visitor device 22 may be associated with a visitor account. Any suitable mechanism for associating a device with an account is expressly contemplated. In some cases, a device may be associated with an account by sending credentials (e.g. a cookie, login, or password etc.) to the server platform 12. The server platform 12 may verify the credentials (e.g. determine that the received password matches a password associated with the account). If a device is associated with an account, the server platform 12 may consider further acts by that device to be associated with that account.

The devices 14, 16, 18, 22 and the server platform 12 may communicate asynchronously, for example, by using an implementation of the WebSocket protocol, such as Socket.IO. Updates may be sent from the server platform 12 to each of the devices 14, 16, 18, 22 in real time as interrupts, i.e., without polling. Likewise, user interaction data may be sent from each of the devices 14, 16, 18, 22 to the server platform 12 in real time as interrupts, i.e., without polling.

Figure 2:
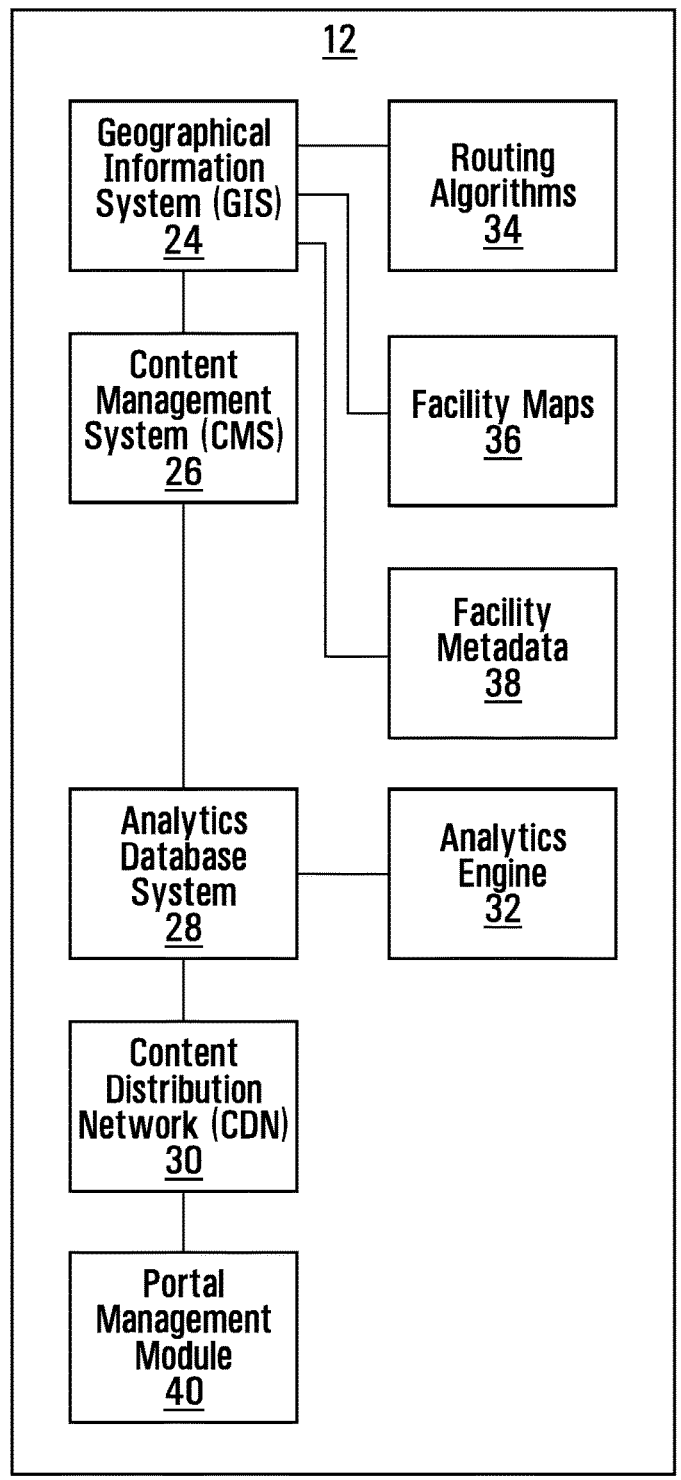
FIG. 2 is block diagram of a server platform of the wayfinding system of FIG. 1.

Turning now to FIG. 2, illustrated therein is the server platform 12, in accordance with an embodiment. The server platform 12 includes a content management system (CMS) 26, an analytics database system 28, and a geographical information system (GIS) 24. The server platform 12 may include multiple backend devices, e.g., servers. The server platform 12 may include at least a database server and a hosting server. In some instances, the server platform 12 also includes a content distribution network (CDN) 28. The CMS 26 and the analytics database system 30 may be hosted by the server platform 12. The GIS 24 may be hosted internally by the server platform 12 or supplied externally.

In some embodiments, the CMS 26 may be a frontend interface application, typically, implemented as a web service. CMS 26 may communicate with GIS 24, which then modifies the database. In this case, GIS 24 may be an Application Program Interface (API) which manipulates the database.

In some embodiments, CMS 26 stores content, including information relating to the facility and the facility units, handles updates to the content received from the devices 14, 16, 18, 22, and provides content to the devices 14, 16, 18, 22. For example, the CMS 26 may be a no structured query language (NoSQL) database application. The content stored in the CMS 26 is customizable for the type of facility. Typically, the information stored for each facility unit includes a profile, a link to a webpage and/or link to a social media page, a photograph, directory information, e.g., a phone number and/or an address, opening hours, event information, promotional information, e.g., an advertisement and/or a marketing message, and/or a promotional item, e.g., a digital coupon. Often, the information relating to the facility and the facility units is tied to a related entry in the facility metadata 38 stored in the GIS 24. This allows larger, less frequently accessed files to be stored in the CMS 26, rather than the GIS 24.

In some embodiments, the analytics database system 28 includes or is operatively connected to an analytics engine 32. The analytics database system 28 may be a database application, typically implemented as a web service. The analytics database system 28 stores all user interactions, e.g., user selections or "hits", searches, dates, types of mobile device, and/or movement patterns represented as heat maps, in real time, and generates analytics relating to the user interactions. Advantageously, because user interactions are recorded for several different the devices 14, 16, 18, 22, a relatively large sample size is obtained. The large sample size may allow analytics engine 32 to plot heat maps that are useful for users and to provide suggestions to improve user experience.

The GIS 24 is, typically, a representational state transfer (REST)-ful application programming interface (API). The GIS 24 includes routing algorithms 34, facility maps 36, and associated facility metadata 38. The GIS 24 may store the facility maps 36 and the facility metadata 38, handle updates to the facility maps 36 and the facility metadata 38, and provide the facility maps 36 and the facility metadata 38 to the devices 14, 16, 18, 22. Typically, the GIS 24 serves the facility maps 36, e.g., as PNG files, and the facility metadata 38, e.g., as JSON/XML files, over the web. The facility metadata 38 is customizable for the type of facility, and may include digital representations of paths, polygons encapsulating facility units, nodes corresponding to facility locations, identifiers for each facility unit, and qualitative metadata, such as the type of path, e.g., hallway or dirt trail. Optionally, information about the objects utilized for a given system (i.e. all of the objects that are used to define a given facility, etc.) can be stored in the server platform in an object library that can be a separate module on the server platform 12, or may be incorporated within the facility maps 36 module, facility metadata module 38 or any other suitable location. The object point cloud data is one attribute for each object that can be stored in the object library.

The GIS 24 also uses the routing algorithms 34 to calculate routes and provides the routes to the devices 14, 16, 18, 22. Typically, the routing calculations output a JSON/XML list of node or polygon identifiers representing a complete path, which the devices 14, 16, 18, 22 will interpret and display. The output may also include points of interest and other metadata 38, such as total estimated travel time based on type of path and real-time traffic, as described herein.

The visitor devices 22 may be efficiently managed and run both online and offline. The visitor devices 22 may create a simple navigation tool that engages visitors as they seek out more information about the venue. Each interface may be carefully designed with a focus on the user experience. Designs can be adapted to each venue's brand and specific needs, providing a unique interface with no disruption to the user experience. The visitor devices 22 may be configured to provide a smooth, intelligent personal indoor mapping experience. Visitors can access directions and venue information from anywhere in the venue. Alternatively or additionally, visitors can plan routes prior to arriving and contact a location by phone or via social media directly from their personalized profile.

The server platform 12 may include a portal management module 40 for managing the system 10. The store device 14, the facility device 16, and the administrator device 18 communicate with the portal management module 40 to create and modify facility related data.

With portal management module 40, all building data may optionally be generated or modified using one tool via a web browser. The portal management module 40 may include collaborative tools with secure user accounts and permissions. In some embodiments, each user may be assigned a role with appropriate security credentials, such as an administrator (administrator device 18), a facility manager (facility device 16), and a store manager (store device 14). The administrator device 18 may have higher security clearance in terms of accessing and updating data, and modifying settings. The facility device 16 can change venue and store description, logos and so on, but may not have permission to alter maps. The store device 14 can modify or alter data relating to their own store. Additional rules may be enforced if desired. For example, user A may only access and/or change certain data pertaining to certain stores, and so on.

For example, a venue editor may log into portal 40 make edits to a map 36 and save the map 36 at different stages. The unfinished map 36 may be saved in draft mode, where the editor may not have permission to publish the updated map until approved by administrator or facility owner, and the system may be configured to track approvals.

Optionally, the maps 36 created using the wayfinding system 10 may be displayed to the user, for example via a display screen on a suitable user device 22 (for example a smartphone and/or tablet) in a two-dimensional (2D) representation (i.e. in a top or plan view) or optionally in a three-dimensional (3D) representation (i.e. a simulated perspective view). In some embodiments, the wayfinding system 10 may be operable to displace a map 36 in both 2D and 3D, and optionally may be operable to change between 2D and 3D representation modes. Optionally, the wayfinding system 10 may include tools for users and/or system administrators to modify and edit the maps. In some embodiments, these map editing tools may be configured to use 2D maps because it may help simplify the editing process.

If a map 36 is a 3D map, it may be helpful in some instances to change the vantage point from which the map 36 is viewed. This may be achieved by positioning a virtual camera relative to the map 36 and providing the view point form the camera on a suitable display to be observed by a user. For example, a 3D map may be viewed from an angle to provide a 3D looking, isometric type representation of the map 36, or alternatively may be viewed from an overhead position to provide a generally top-down view of the 3D map (which may visually resemble a 2D map in some aspects). Optionally, the changes between the map vantage points may be selected manually, for example by a system user, may be automatically determined by the wayfinding system 10 based on any suitable criteria, and/or the wayfinding system 10 may be configured to allow both types of reconfiguration (i.e. the system 10 may automatically present a given vantage point but may allow a system user to override the default view selection). The criteria used for the wayfinding system 10 to automatically determine if a particular map 36 or map segment ought to be rendered in a 2D representation or a 3D representation may include one or more of a variety of suitable factors, including the scale of the map (larger scale view may be presented in a top down view, whereas local views may be presented in 3D view), type of representation (a store layout may be presented from and angled perspective by default, whereas a map showing an entire floor of a mall may first be presented in a top down view), nature of objects to be presented, arrangement of objects in the map (a top down view may be suitable if some objects of interest may be visually obscured by other objects if represented from an angled perspective).

In the illustrated example, the 3D rendering can be displayed to the user from the perspective of a virtual camera that is positioned within the virtual world or map coordinate space. The virtual camera can be moved throughout the map coordinate space to provide virtual view points from a variety of different positions/perspectives. If a system user wishes to modify the 3D display they are viewing, for example to rotate the view to observe the map from a different virtual perspective, the virtual camera can be moved within the map coordinate space so that it is positioned in a suitable location to provide the desired view/perspective on the 3D map. This may appear to a system user as if the 3D map is moving relative to their view point and/or that they are moving through the virtual 3D map environment.

In some embodiments and/or applications, it may be desirable to allow a user to manipulate the manner in which the 3D map 36 is presented on a user display device, and in some instances it may be desirable to allow the user to manually manipulate the presentation of the map 36 (as opposed to selecting from one or more pre-set viewing positions). For example, a user operating a user device 22 may want the ability to manually pan, rotate, zoom and otherwise manipulate the 3D map as displayed on the user device 22. In instances where the user device 22 includes a touch sensitive display, the wayfinding system 10 may be configured to allow the user to change the map display via the touch controls on the user device. Preferably, the map 36 can be configured to respond in a user-friendly, and generally intuitive manner. This may help allow a user to rotate or otherwise manipulate the map 36 without requiring significant training and may help improve user satisfaction with the wayfinding system 10. This may also help the user's inputs to be more accurately and/or naturally represented in the display, which may be beneficial in the mapping/wayfinding context.

However, typical user input devices, such as a touch screen display on a smartphone, table or kiosk-type display may provide users with a 2D display and a 2D user input mechanism, such as a planar touch screen display. Converting user inputs on a 2D display and/or 2D user input mechanism onto the 3D map displayed can be challenging.

Some existing methods for manipulating a 3D model on a display, such as those used in some video games and some 3D modelling software, may not provide an intuitive experience to some system users. With regard to mapping and wayfinding systems, early digital mapping technology was configured to generate and display 2D maps. When using a 2D map, manipulating the map using 2D user inputs (such as translate, scale and rotate) into 2D transformations could be done using known 2D transformations. While some mapping and wayfinding systems have now been updated to display 3D maps, the methods for manipulating the 3D maps based on user inputs have generally be based on techniques adapted from 2D mapping systems. For example, some 3D mapping systems utilize a transformation method in which inputs from existing 2D touch interactions are received and then decomposed into corresponding traditional 2D transformation components (translate, scale, rotate). The translated 2D inputs can then be applied to the 3D scene/map model through various mechanisms. However, such mechanisms do not, to the inventor's knowledge, provide a direct relationship between the 2D touch points and the 3D display. This may tend to produce an unintuitive and "detached" feeling as the user manipulates the 3D map, in which displayed 3D map model does not match the behavior expected by the user. For example, in such systems the points in the 3D scene/display that the user pressed on a touch screen interface may not adequately follow the user's fingers as they are moved across the touch screen. Such systems may tend to require users adapt to the particular manner in which the system rotates the map display, and learn how to manipulate the system to help achieve the desired display output.

To help facilitate user control/manipulation of 3D maps (and any other analogous 3D displays and models, etc), the present specification discloses at least one example of a new system and method for manipulating 3D models. In at least one exemplary embodiment, the system and method can help a user manipulate 3D maps displayed on user device that includes a touchscreen display. The method can help facilitate manipulating the 3D maps by recording where a user touches the 2D touchscreen (or otherwise engages the 3D map—such as using a mouse pointer or the like), and then determining which portions and/or objects in the 3D map the user is intending to touch. That is, if the user were able to directly touch a 3D model of the map displayed, the system can attempt to identify which objects/locations in the map the user would be touching. Based on the perspective from which the 3D map is displayed, the location on the touchscreen interface that at user perceives as being related to a given object in the map may or may not directly overlie the object (and most often will not, unless the 3D map is displayed in a generally top down or overhead view).

The identification of the objects may be done in any suitable method, including, for example, projecting the locations where a user touches the touchscreen 2D touch points onto the 3D map. For example, by determining where a point on the 2D touchscreen would actually lie on the 3D map by extrapolating a line extending from the user's touch point to the 3D map based on the position of the virtual camera relative to the 3D map. For a given user interaction, the user's touch points on the display can then be generally locked to their corresponding, projected points on the 3D map for the most or all of the duration of the user manipulation.

The system may also then directly calculate a 3D transform matrix which maintains the lock as the user's 2D points are moved, for example by a user moving her fingers relative to the touchscreen display (or by manipulating a computer mouse, joystick or other such input device). The resulting 3D transform matrix can be used to update the camera position and orientation values so as to re-position the virtual camera, which may update the way in which the 3D map is shown on the user display device. For example, the method may create a relationship between the 2D display and the 3D scene using a virtual camera structure, which may include an affine world transform (i.e. an affine transformation in the map co-ordinate space) which may help give the virtual camera its position and orientation in the 3D map space. This map/display space transform may then be combined with a non-affine perspective transform which may help provide the rendered scene perspective (i.e. so that objects further away from the virtual camera may appear smaller than those closer to the virtual camera position). These combined transforms may help define a new camera matrix for rendering the 3D model/map (i.e. may help generate the new, updated camera position and orientation values).

Figure 3:
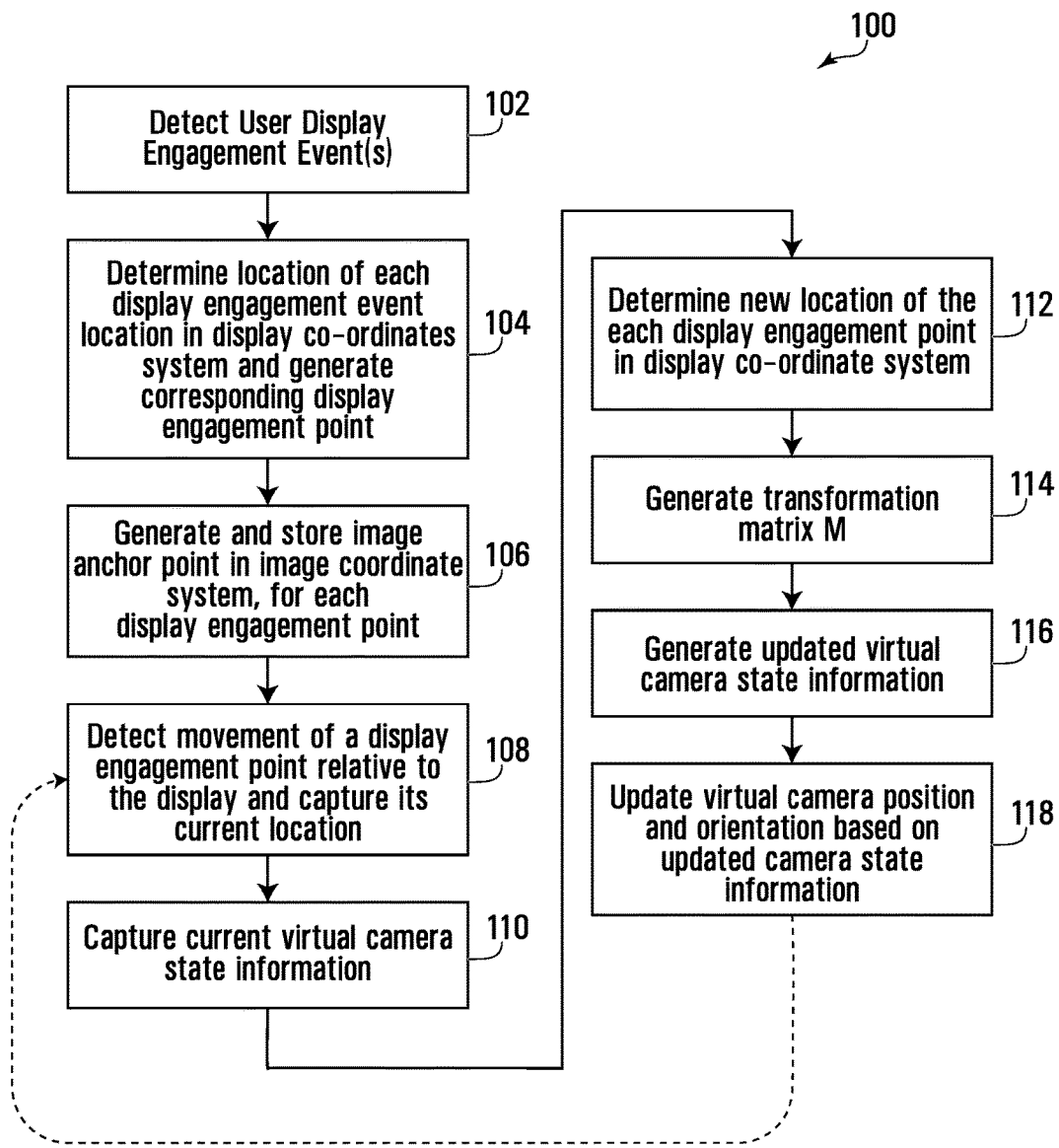
FIG. 3 is a schematic representation of one example of a method of manipulating a 3D model.

Referring to FIG. 3 one example of a method 100 of manipulating a 3D display can include the step 102 of detecting one or more display engagement events, where a user has engaged the model being displayed for the purpose of manipulating the display. Examples of such display engagement events can include a user touching a touch sensitive display screen, clicking an object in the display using a mouse point or other such input device and the like. The wayfinding system 10 may be operable to detect a single engagement event (i.e. a touch with a single finger), two simultaneous engagement events (i.e. two fingers touching the display at the same time) and/or more than two simultaneous engagement events (i.e. three or more fingers touching the display at the same time). The wayfinding system 10 may detect and recognize the engagement events using any suitable method, including those described herein. Until one or more engagement events are detected, the display shown to the user can remain constant. When one or more engagement event(s) has been detected, the method 100 can be activated.

Having detected an engagement event, described as a touch event in the present examples for simplicity (but could be any type of engagement event), the wayfinding system can determine the location each such the touch event based on a local, display coordinate system (typically a planar x/y coordinate system or a 2D display screen), and the system can define a display engagement point (for example D1, D2, etc.) for each user touch event and define its position as location data $s_{01}$, $s_{02}$, etc. (meaning the location $s_{0n}$ of a display engagement point Dn in x,y coordinates at the time "zero" when the touch event is first registered).

Figure 9:
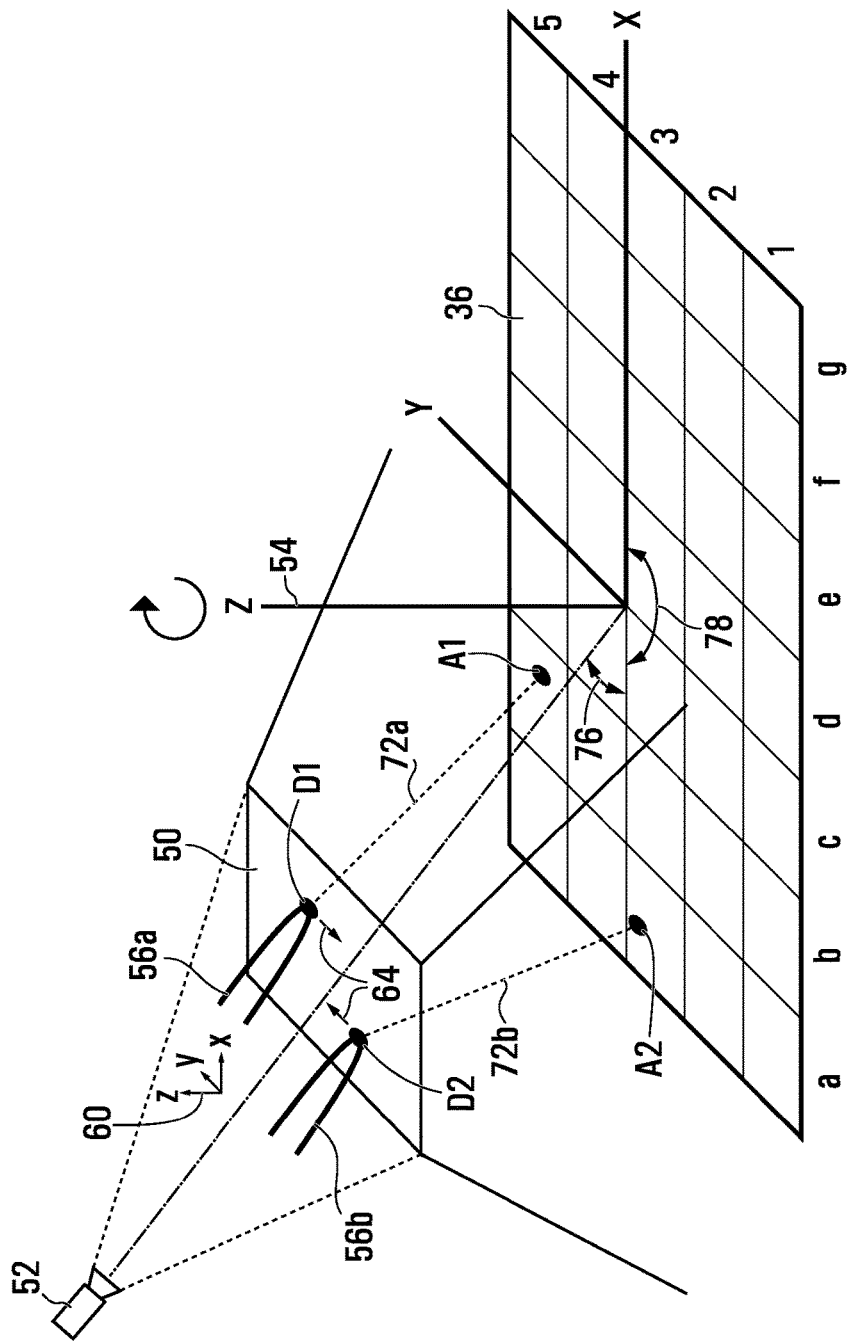
FIG. 9 is a schematic representation of one example of a system that can facilitate the manipulation of a 3D model, in an initial configuration.

The wayfinding system 10 can also capture the state information for the virtual camera when a given touch point, which can be represented as an affine transform matrix T (containing the camera position data as x, y, z co-ordinates in the 3D model co-ordinate system, along with the camera pitch—see angle 76, and yaw values—see angle 78 in FIG. 9), set as $T_0$ at time zero, and non-affine perspective matrix P, set a $P_0$ at time zero. These values may be obtained from any suitable source, such as a user display device or any other device associated with a given wayfinding system 10, and/or may be calculated on demand by the wayfinding system 10 and the like.

Optionally, as shown in the illustrated examples, the T matrix can be a 4×4 matrix describing the affine world/model transform of the virtual camera relative to the model coordinate system. This can encode the virtual camera's 52 x,y,z position in 3D space, and it's orientation which can be described in many different forms. For example, the wayfinding system 10 may use Euler Angles to describe rotation of the virtual camera about the Z axis, then about the Y axis, and then about the X axis of the model coordinate system.

Optionally, as shown in the illustrated examples, the virtual camera may point down the negative Z axis and the "ground" of the 3D map 36 model may exist in the x,y plane (where z=0, where positive z would be moving "up" towards the sky and negative z would be moving "down" deeper underground). In this configuration, by first applying a rotation about the z axis generally applies an "azimuth" or "yaw" to the virtual camera 52. If the wayfinding system 10 then applies a rotation about the x axis it can apply an "elevation" or "pitch" to the virtual camera 52. In this description, the terms "azimuth" and "elevation" are used in reference to an azimuth/elevation camera system.

In the illustrated examples, the P matrix is a non-affine "perspective" transformation matrix, and is what the wayfinding system 10 can optionally use to give the virtual camera 52 it's field of view in the x and y axis (of model coordinate system 54). That is, the application of the P matrix may help make objects in the distance appear smaller than objects closer to the virtual camera 52, and may help create a camera "frustum". While an affine matrix, such as matrix T, generally means that two lines that are parallel before the matrix is applied will continue to be parallel after the affine matrix is applied to those two lines, a non-affine transform, such as matrix P, general means that two lines that are parallel before will not continue to be parallel after the transformation. That is, a non-affine transform may distort the model coordinate space and makes lines converge and diverge.

The wayfinding system 10 can then generate a corresponding model anchor point (i.e. a map anchor point A—step 106) corresponding to teach display engagement point D. That is, the system can generate an anchor points A1, A2, . . . An, corresponding to display engagement points D1, D2, . . . Dn.

For each 2D point on the touchscreen ("display engagement point") the system project that point into the 3D model coordinate system using the current virtual camera matrices, and where that projected ray intersects with an object in the 3D model coordinate system ("hit test"), the system records that point of intersection in the 3D model coordinate system as corresponding to the current 2D point on the touchscreen ("display engagement point").

The location of each anchor point in the x, y and z of the 3D map co-ordinate system (as opposed to the 2D display co-ordinate system) can be defined as location information w (x, y, z, co-ordinate value in the model co-ordinate system), with locations $w_1, w_2, \ldots w_n$ being generated for the respective anchor points A, where $$w_n = (T^{-1}P)^{-1} s_{0n}$$

And in reverse:

$$s_{0n} = (T^{-1}P) w_n$$

The display engagement points can be projected onto the model using any suitable technique, including a hit test algorithm that can be applied for a given display engagement point and may use the camera state values, captured when the display engagement point is initially created (optionally $P_0$ and $T_0$). Optionally, the hit test algorithm may be set so that the anchor points are located where the projection of the display engagement points first intersects a 3D object on the model. For example, the map anchor points may be located at the intersection of the projection of the display engagement point and a building, store, obstruction or other such objects on the model. Alternatively, the hit test algorithm may be set so that the anchor points are located where the projection of the display engagement points intersects the base x-y plane of the map 36 (i.e. the representation of "ground level" in a typical map), such that each map anchor points has a value of 0 (zero) in the z-axis of the model coordinate system.

The anchor point location information w is then stored, and remains unchanged during the rest of the method 100.

The wayfinding system 10 may then wait until movement of any one or more of the display engagement points P, relative to the display, is detected. For example, the user may modify their user inputs on the display device, such as by sliding a finger across a touch sensitive display screen. When movement is detected (step 108), the wayfinding system 10 may define a new time index "t1" and may capture the location, $s_1$ of each display engagement point D. The wayfinding system 10 may also capture virtual camera state information at time "t1", to provide matrices $T_1$ and $P_1$.

The virtual camera state information includes virtual camera position and orientation. The virtual camera position includes X, Y, and Z position values. The virtual camera orientation includes tilt, pitch, and yaw rotation values.

At any desired frequency, the wayfinding system 10 can then determine the new, updated location of each display engagement point D on the display (x, y values in the display co-ordinate system), which is defined as S (i.e. $S_1$, $S_2$, . . . $S_n$ . . . ), at step 112.

Using the capture position and virtual camera state information, the wayfinding system 10 may then generate, and solve, a system of equations to define a transformation matrix M, based on:

$$s_1 = ((T_1)^{-1} P_1) w_1$$

$$S1 = ((T_1 M)^{-1} P_1) w_1$$

for an example in which only a single display engagement point is being tracked, or $$s_1 = ((T_1)^{-1} P_1) w_1$$

$$s_2 = ((T_1)^{-1} P_1) w_2$$

$$S_1 = ((T_1 M)^{-1} P_1) w_1$$

$$S_2 = ((T_1 M)^{-1} P_1) w_2$$

for an example in which two display engagement points are being tracked simultaneously (step 114).

To help facilitate a useful solution to these equations, the traits of the transformation matrix M can be constrained in any suitable manner, including, for example, being constrained so the transformation is limited to a translation in the x-y plane of the model coordinate system if only one display engagement point/map anchor point is provided, or constrained so that the transformation is limited to translation in the x,y and z axis axes of the model co-ordinate system, and rotation about the model coordinate system's z axis if two display engagement points/map anchor points are provided.

For example, when manipulating a 3D map and when there is only a display engagement point D, and a corresponding single anchor point A, then the transformation matrix M may be constrained to only allow translation in the x and y axis of the map co-ordinate system. This can help translate the user's translation inputs on the display screen into a translation (i.e. pan) of the virtual camera relative to the map 36, and a view of a translating/scrolling map displayed to the user. Alternatively, when two display engagement points are used on the D1 and D2 (and two corresponding anchor points A1 and A1), the set of constraints applied to M are translation in the x,y and z axis axes of the map co-ordinate system 54, and rotation about the map co-ordinate system's z axis. Transformation constraints of this nature may be preferable in some embodiments of a wayfinding system as they may help limit virtual camera movement to the types of movements that a human user may typically perform in the real world environment, such as physical translation within the space, and turning the head and body from side to side (rotation). Such transformation constraints also help limit the number of potential solutions to affect the desired transformation and/or may help preventing unambiguous scene manipulation. If the model displayed is something other than a map, the transformation constraints used to help define the transformation matrix M may be different.

The method 100 can then update the virtual camera state information T position and orientation values with new, updated values $T_2$, where $T_2=T_1*M$ (step 116), that represent the new, desired point of view to be displayed to the user. The virtual camera state information can then be executed and the position of the virtual camera and be updated to provide an updated display to the user (step 118).

Optionally, some of the steps in method 100 can be iterated, and may be iterated at a desired frequency. For example, steps 108-118 may be iterated at a rate of 20-110 Hz, and optionally at between about 40-80 Hz, between about 50-70 Hz and at about 60 Hz, which may allow the changes to the display to appear smooth and visually pleasing to a user.

Figure 8:
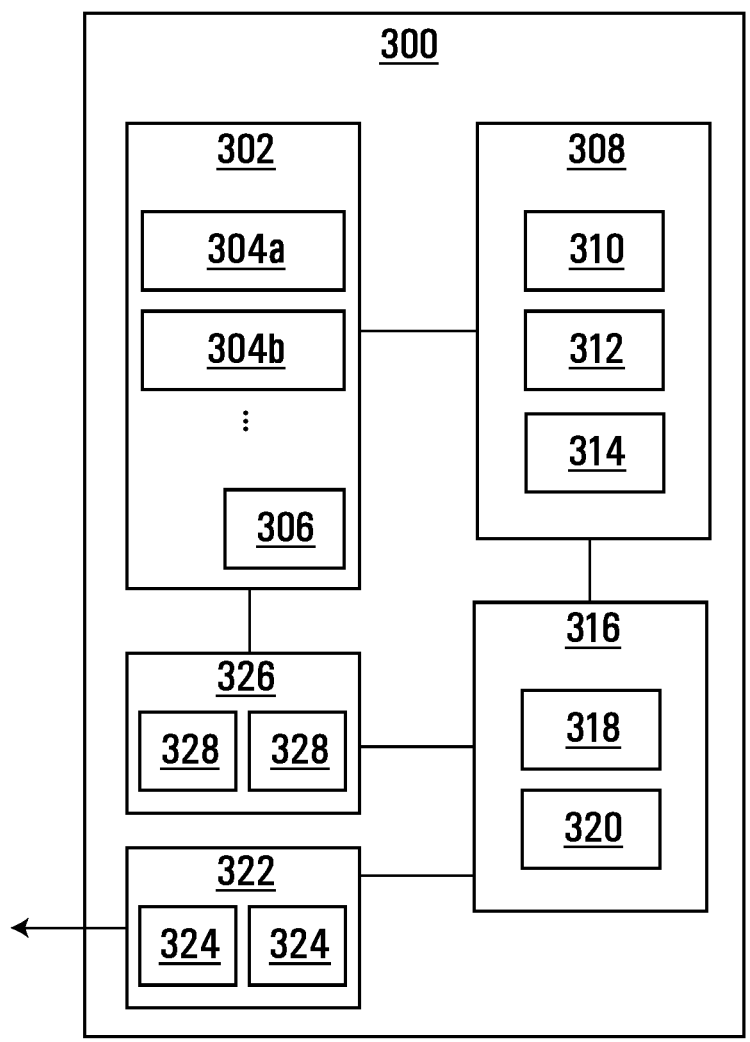
FIG. 8 is a schematic representation of a camera controller.

Optionally, the wayfinding system 10 may include any suitable camera controller or control module that execute the methods described herein and can retrieve and/or calculate and/or store system information (such as virtual camera state information, display engagement point information, anchor point information and the like) that can be used to perform the methods. One example of a camera controller 300 is schematically illustrated in FIG. 8. The camera controller 300 may include hardware, software, firmware and any combination thereof, and may be provided on the server platform 12 as a separate controller, as a sub-module of another system module and/or in any other accessible location.

The camera controller 300, in this example, can include user engagement module 302 that can detect and/or store use inputs that are intended to generate display engagement points (i.e. events when the user is intending to engage and interact with the displayed model). In the illustrated examples, user engagement module 302 can be a touch sensing module that can detect one or more user touch events on the display screen 50.

The user engagement module 302 may optionally include two active engagement slots 304a and 304b, and may include an engagement queue to store additional, pending engagement events (e.g. touch events).

The camera controller 300 may also include a matrix generator 308, that may be operable to generate and store the T, P and M matrices described herein, as well as any intervening matrices, and the like. Optionally, the matrix generator 308 may have fields 310, 312 and 314 to store the T, P and M matrices respectively.

The camera controller 300 can optionally include a constraint library 316, that can store pre-determine system constraints, such as the single engagement point constraints 318 and the two engagement point constraints 320, that can be queried and provided to the matrix generator 308 when generating the M matrix based on the number of display engagement points the user has provided.

The camera controller 300 may also include a camera state generator 322 that can optionally be configured to define and store the current/initial camera state data when a user first engages the wayfinding system 10 (i.e. first touches the screen) in an initial state field 324 (the T matrix data). The camera controller 300 can also be operable to generate updated camera state information, for example by updating the virtual camera state using the transformation matrix data (i.e. $T_2=T*M$) and can output the new virtual camera state data to the wayfinding system 10.

The camera controller 300 may also include an anchor point generator 326 that is operable to calculate the anchor points corresponding to each display engagement point, and to store the anchor point location information (w) for each anchor point in storage fields 328, which can be queried during the execution of method 100.

Figure 10:
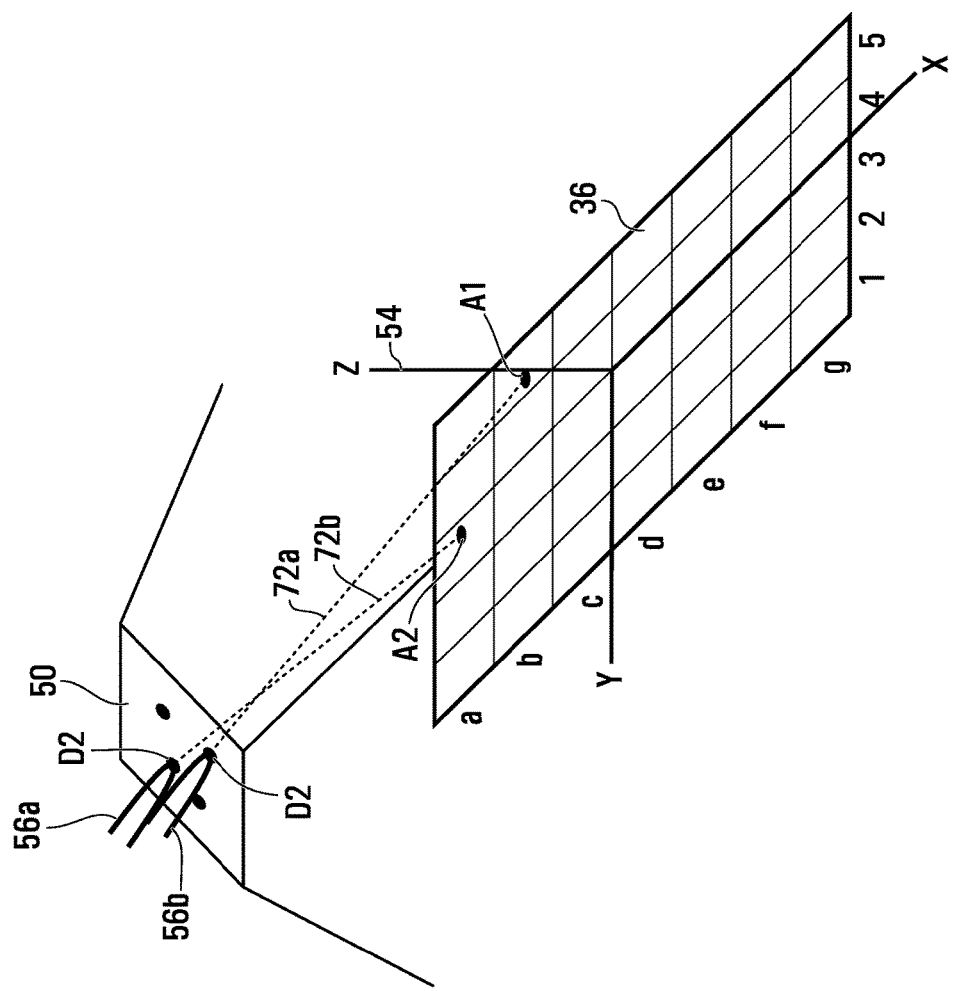
FIG. 10 is the schematic representation of FIG. 9 in an updated configuration.

Referring to FIGS. 9 and 10, one example of an application of the method of manipulating a 3D display using a wayfinding system, such as wayfinding system 10 using the method 100, is schematically illustrated. In this example, the wayfinding system 10 includes a portable user device 22, such as a tablet, PDA, smartphone, that includes a touch sensitive display screen 50, which in these figures is illustrated as being positioned above a 3D map to illustrate the application of method 100. The wayfinding system 10 includes a virtual camera 52 which is schematically illustrated where it would be positioned to provide the view shown on the display screen 50. That is, the display screen 50 can be understood to be positioned generally between the virtual camera 52 and the map 36 in these examples (see also FIG. 22). In this embodiment, the position and orientation of the virtual camera 52, expressed in the co-ordinate system 54 of the 3D map can be defined using suitable x, y, and z position values, as well as pitch and yaw values.

In this example, the display screen 50 is a touch-sensitive display (a touchscreen) and can detect where a user touches the display screen 50. As shown in FIG. 9, a user may wish to change the way the map 36 is displayed on the display screen 50. To manipulate the 3D map, the user can touch the 2D display screen 50 with her fingers or other suitable object (stylus, etc.), and in the illustrated example the user's fingers are schematically represented by a fingers 56, and specifically a first finger 56a and a second finger 56b.

The display screen 50 is configured to detect where the user's fingers 56 touch the display screen 50, and to define respective display engagement points D1 and D2, identified as D1 and D2 on the surface of the display screen 50. The user device 22, and/or other suitable portion of the wayfinding system 10 can capture the position of the display engagement points D1 and D2 in the local, display-based 2D co-ordinate system 60 (i.e. capture local x and y co-ordinate values). The display engagement points D1 and D2 at the beginning of the user manipulation process can be referred to as anchor points, as they will form the basis for the subsequent manipulation of the 3D map.

Having located the anchor points D1 and D2, the wayfinding system 10 can record the initial/current co-ordinates of the points D1 and D2 in the display co-ordinate system and define respective 3-component vectors "s" in the display co-ordinate system where $s_x$ and $s_y$ correspond to pixel coordinates in the display's 50 x/y axes and $s_z$ represents a virtual 'depth' distance of the point (D1 or D2) within the virtual camera frustum relative to the front or back of the frustum. That is, the $s_z$ value can be understood as representing the distance of the point 'into' the display screen 50.

The wayfinding system 10 can then generate a 3 component vector "w" to project each display engagement point D1 and D2 onto a corresponding model engagement point, which in this example can be a map anchor point A1 and A2. The "w" information for each display engagement point D1 and D2 can be calculated as described herein.

Figure 22:
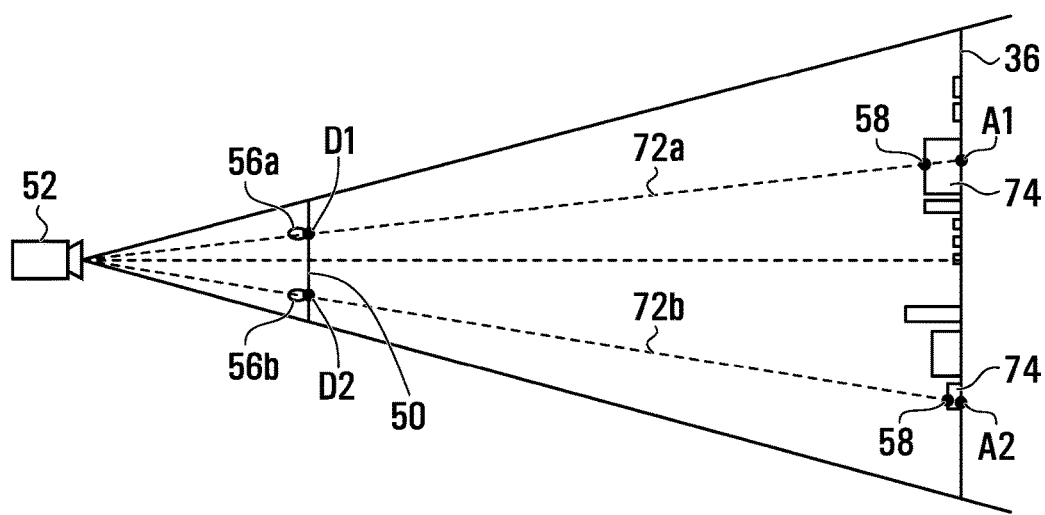
FIG. 22 is a schematic representation of another example of a system that can facilitate the manipulation of a 3D model, in an initial configuration.

The relationship between the display engagement points D1 and D2 and the corresponding map anchor points A1 and A2 may be determined in any suitable manner. For example, the position of the point D1 on the display screen 50 may be projected unto the map 36 based on respective projection axis 72a or 72b and using a suitable hit test algorithm. In this example, the anchor points A1 and A2 are defined as points that lie on the x-y plane in the map coordinate system 54, but alternatively could be defined as points on other map objects, such as alternative anchor points 58 as shown in FIG. 22.

Referring to FIG. 9, in the illustrated example a grid is overlaid on the 3D map 36 to help visualize the relative locations of map display points A1 and A2. This grid is for illustrative purposes only and need not be included in the map 36 displayed to a user when the wayfinding system 10 is in use. In this example, map display point A1 corresponds to map grip location b5, whereas map display point A2 corresponds to map grip location a3.

Figure 5:
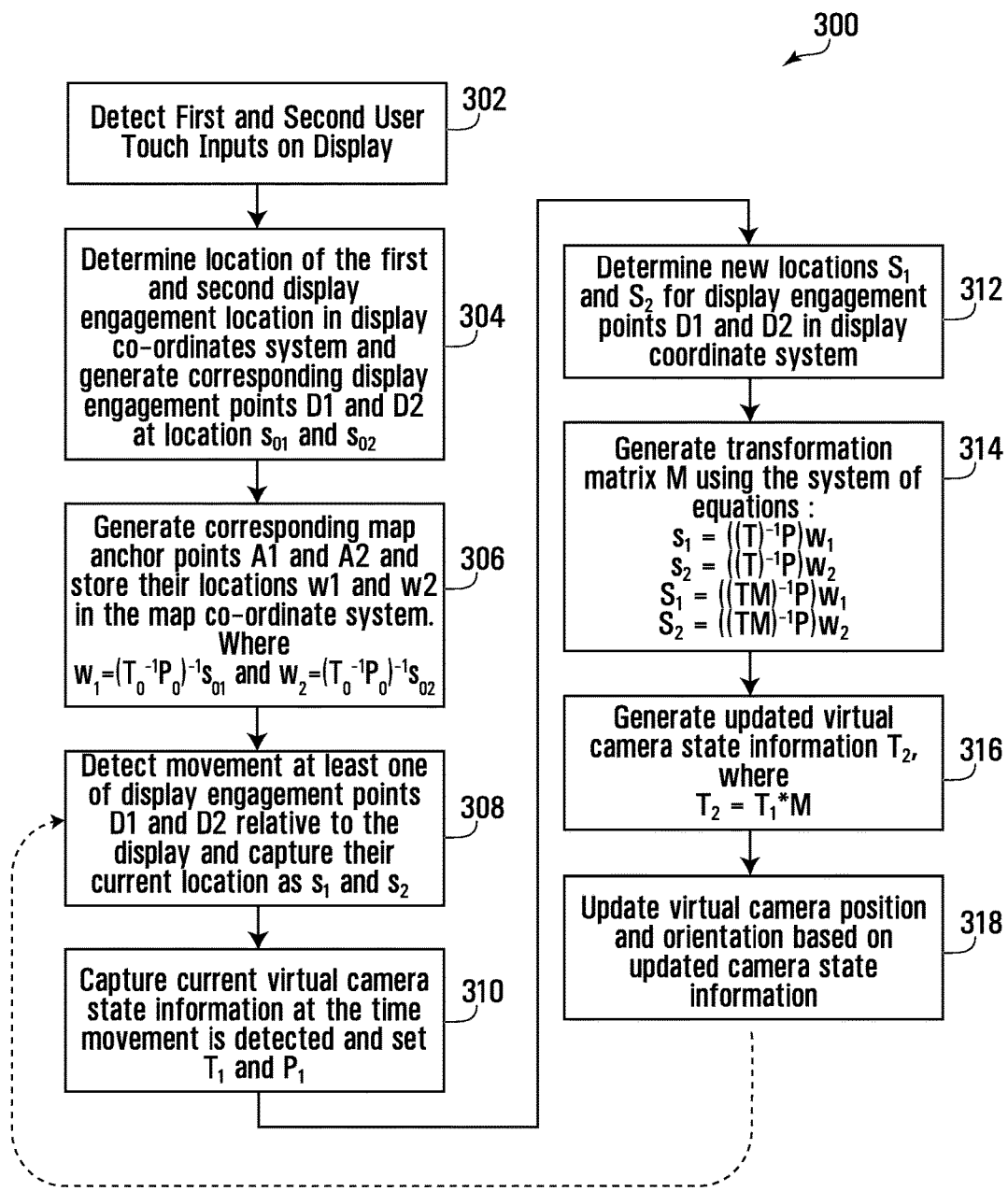
FIG. 5 is a schematic representation of one example of a method of manipulating a 3D model based on two display engagement points.

To effect the manipulation of the map 36, the user can move her fingers across the display screen 50, as indicated by arrows 64, which in this illustrated example is intended to impart a rotation of the map 36 about its z-axis (in the map co-ordinate system 60). Referring to FIG. 5, in this example the user has translated her fingers 56a and 56b across the surface of the display screen 50 to arrive at new, updated display engagement points D1 and D2 (with original D1 and D2 points shown in phantom). During this movement phase, the positions w of the anchor points A1 and A2 remain unchanged.

The wayfinding system 10 can then calculate a new 4×4 transformation matrix "M" that can help ensure that the new, updated display engagement points D1 and D2 are still associated with (i.e. still project to) the corresponding map engagements points A1 and A2, so that the points A1 and A2 will appear to be directly beneath the users fingers throughout the transformation.

Once the M transformation matrix has been defined for this given example, the new $T_2$ virtual camera state information can be applied to update the display of the map 36 on the screen 50.

Referring to FIG. 10, after the transformation has been applied in the present example, the map 36 will appear to the user to have rotated about 90 degrees relative to the display screen 50 (i.e. about the z-axis of the map coordinate system 54), while the updated display engagement points D1 and D2 are still mapped onto the same map anchor points A1 and A2 that are still located in map grids b5 and a3 respectively. When using the method 100, the map anchor points A1 and A2 may appear to always be positioned "beneath" the user's fingers 56a and 56b during the map manipulation process. This may give the user a generally intuitive feeling that the points A1 and A2 are anchored in place relative to the display screen 50 (and the user's perception of the map 36) because the user has placed fingers in those locations, and that the map 36 then appears to be translating or rotating relative to the selected anchor point locations. This may resemble, to a user, how a real word object, such as a piece of paper, may behave if touched and manipulated by a user's fingers in an analogous manner.

Figure 4:
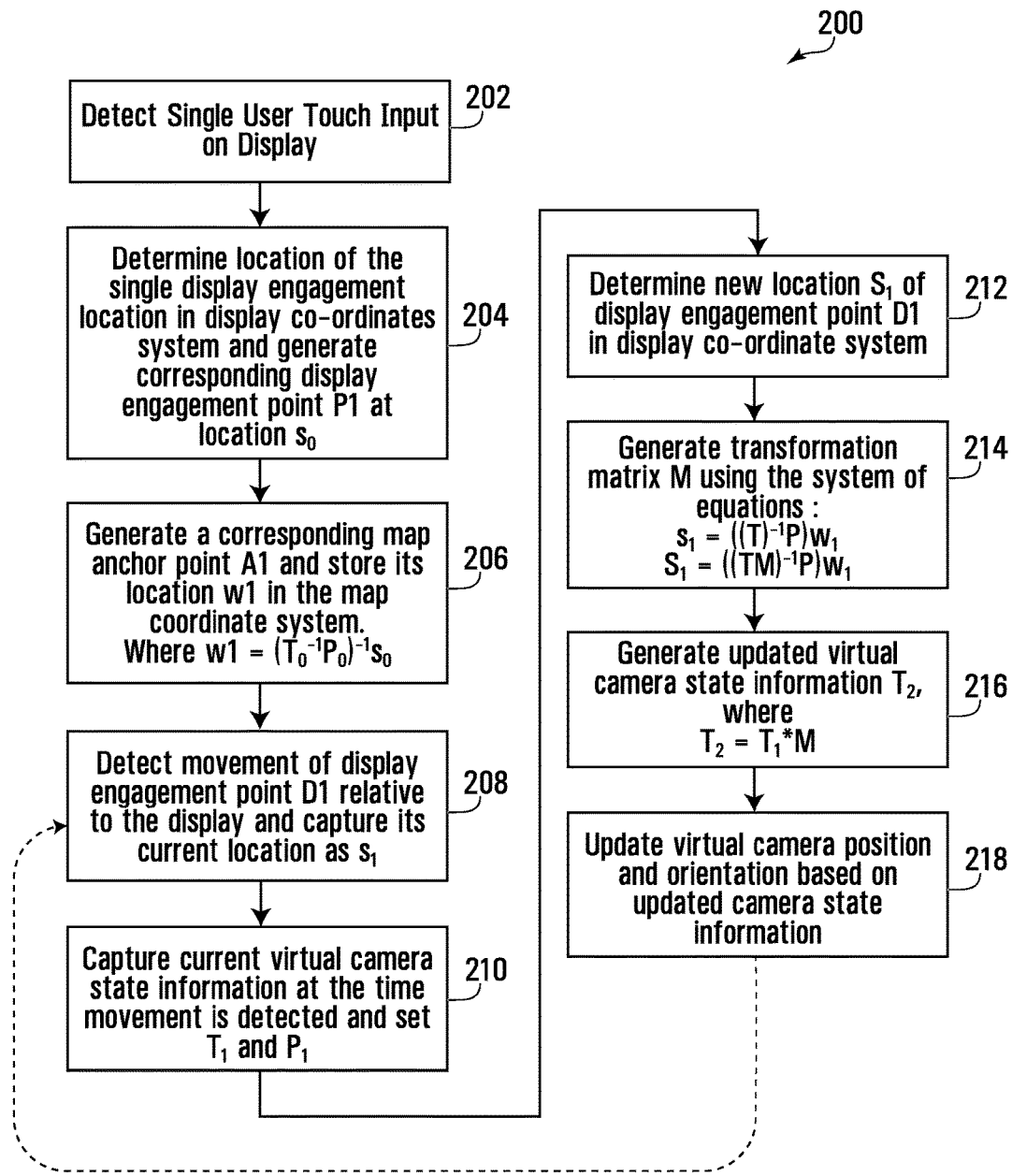
FIG. 4 is a schematic representation of another example of a method of manipulating a 3D model based on a single display engagement point.
Figure 11:
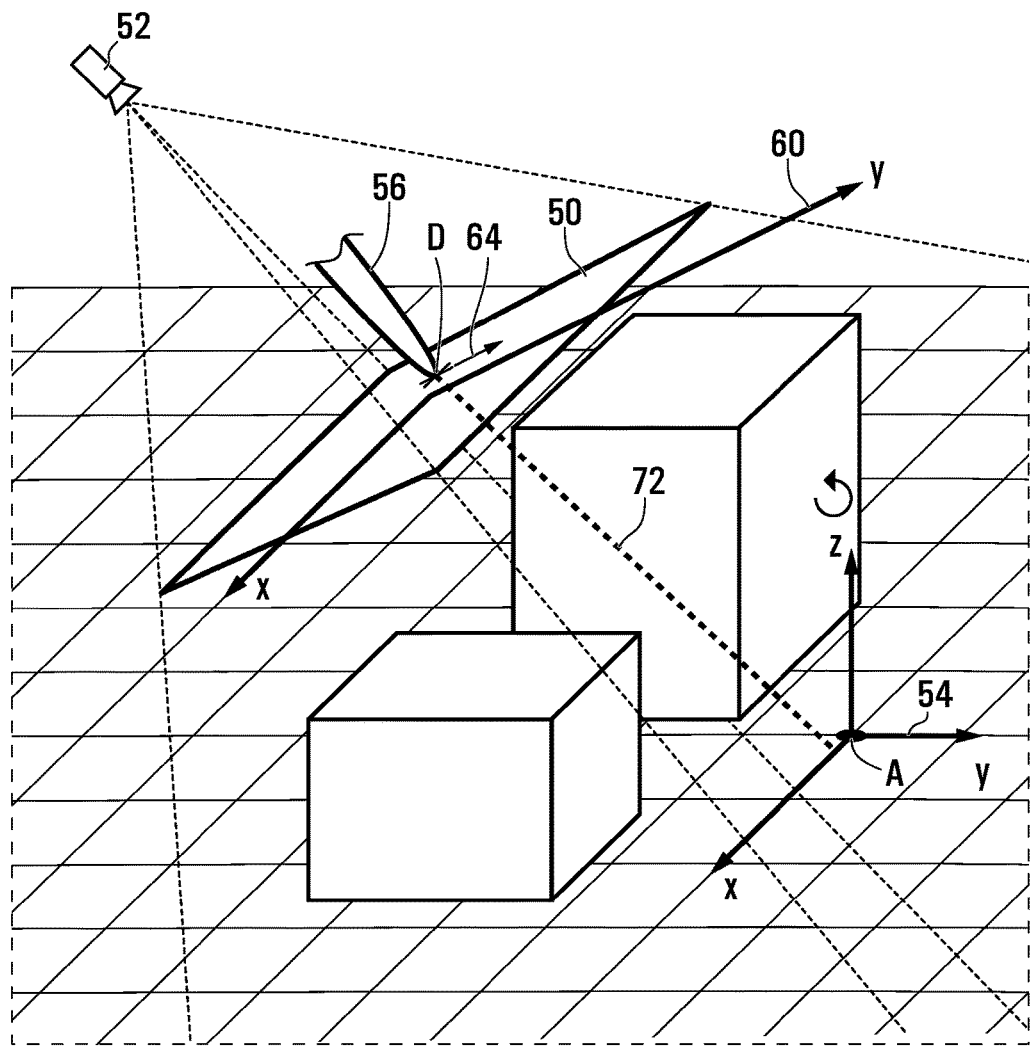
FIG. 11 is a schematic representation of one example of a system that can facilitate the manipulation of a 3D model, in an initial configuration.
Figure 12:
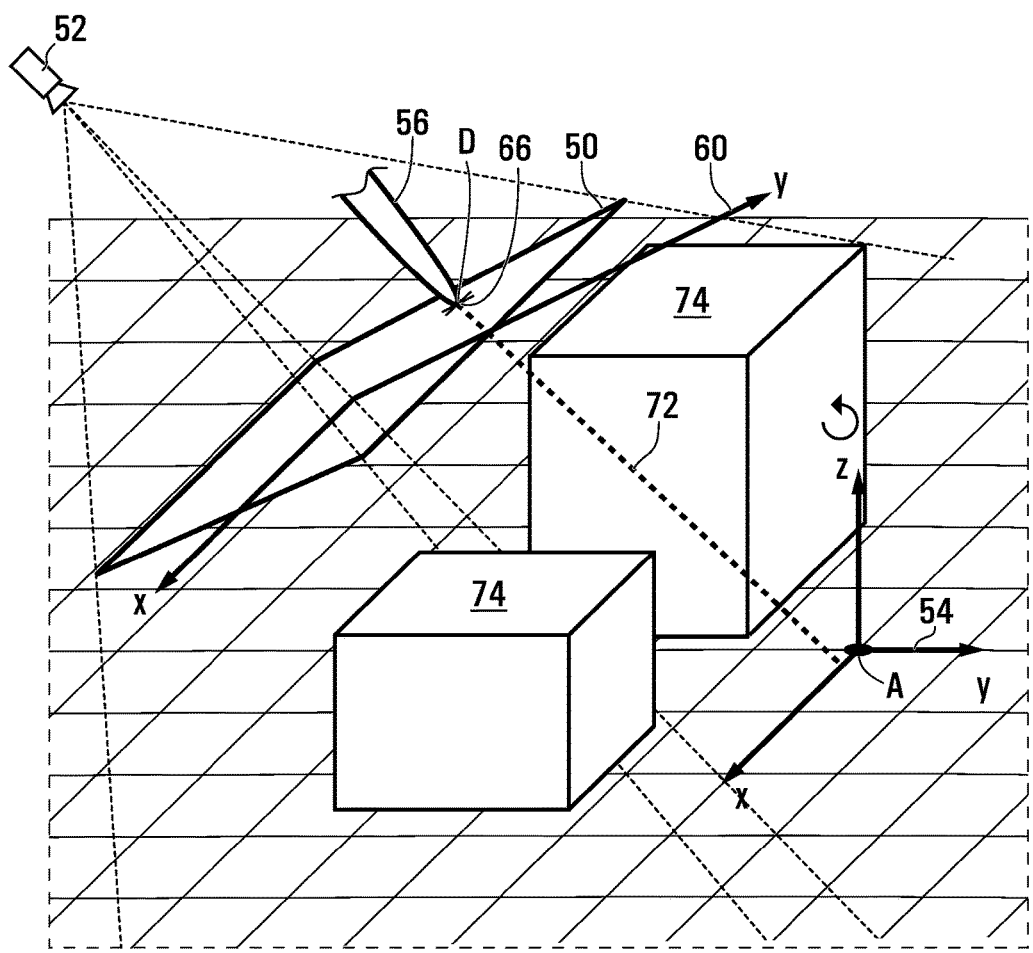
FIG. 12 is the schematic representation of FIG. 11 in an updated configuration.

Referring to FIGS. 11 and 12, another schematic example of portions of a wayfinding system 10 is illustrated. In this example, the map 36 includes schematic representations of buildings 74. In this example, the user touches the display screen 50 with a single finger 56, creating a single display engagement point D, and a single anchor point A—located at the origin of the map coordinated system 54 in this example. To translate the map 36, the user can move her finger upwardly in the y-direction of the display coordinate system 60 from the position in FIG. 11 to the position in FIG. 12. The wayfinding system 10 can then use the methods described herein, such as the method 200 of FIG. 4) to update the position of the virtual camera 52 to update the display provided to the user. Method 200 is generally analogous to method 100, and analogous steps are indicated by like reference characters indexed by 100.

In this example, the location w, of model anchor point A is set (steps 202-206) when the touch is first detected as:

$$w = (T_0^{-1} P_0)^{-1} s_0$$

and A remains at the origin during the duration of the current user display input (i.e. as long as the user keeps finger 56 on the screen). When the user movement is detected, the system of equations (step 208-212), including $S_1 = ((T_1 M) - 1 P_1) w$ can be generated. With this, the transformation matrix M, which is constrained to only allow translation in the x-y plane, can be defined (step 214) as the following 4×4 matrix:

$$M = \begin{matrix} 1 & 0 & 0 & 0 \\ 0 & 1 & 0 & 0 \\ 0 & 0 & 1 & 0 \\ x & y & 0 & 1 \end{matrix}$$

The system of equations can be solved for "x" and "y" above, which can be used to calculate the new virtual camera state information $T_2 = T_1 / *M$, and used to update the virtual camera position (steps 216-218).

Figure 13:
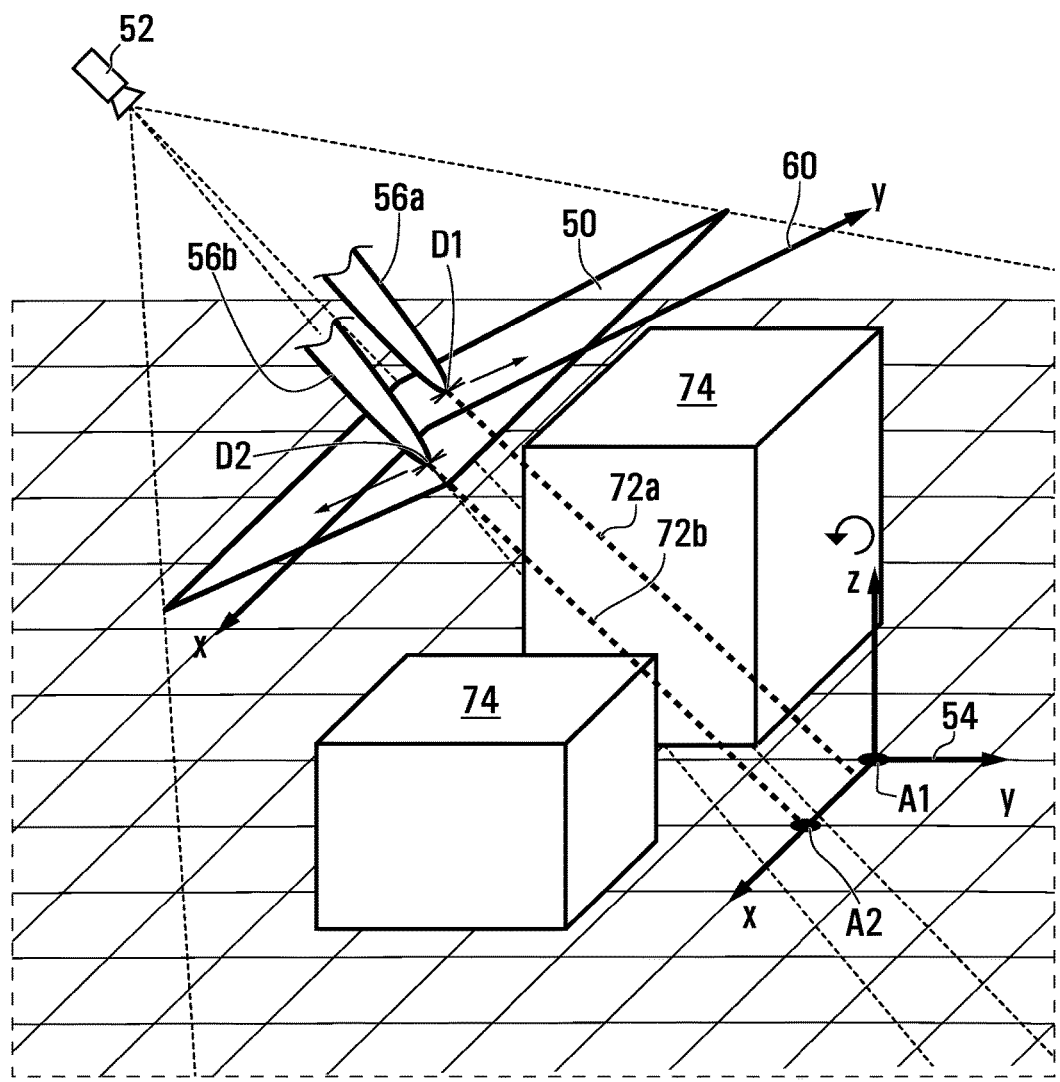
FIG. 13 is a schematic representation of one example of a system that can facilitate the manipulation of a 3D model, in an initial configuration.
Figure 14:
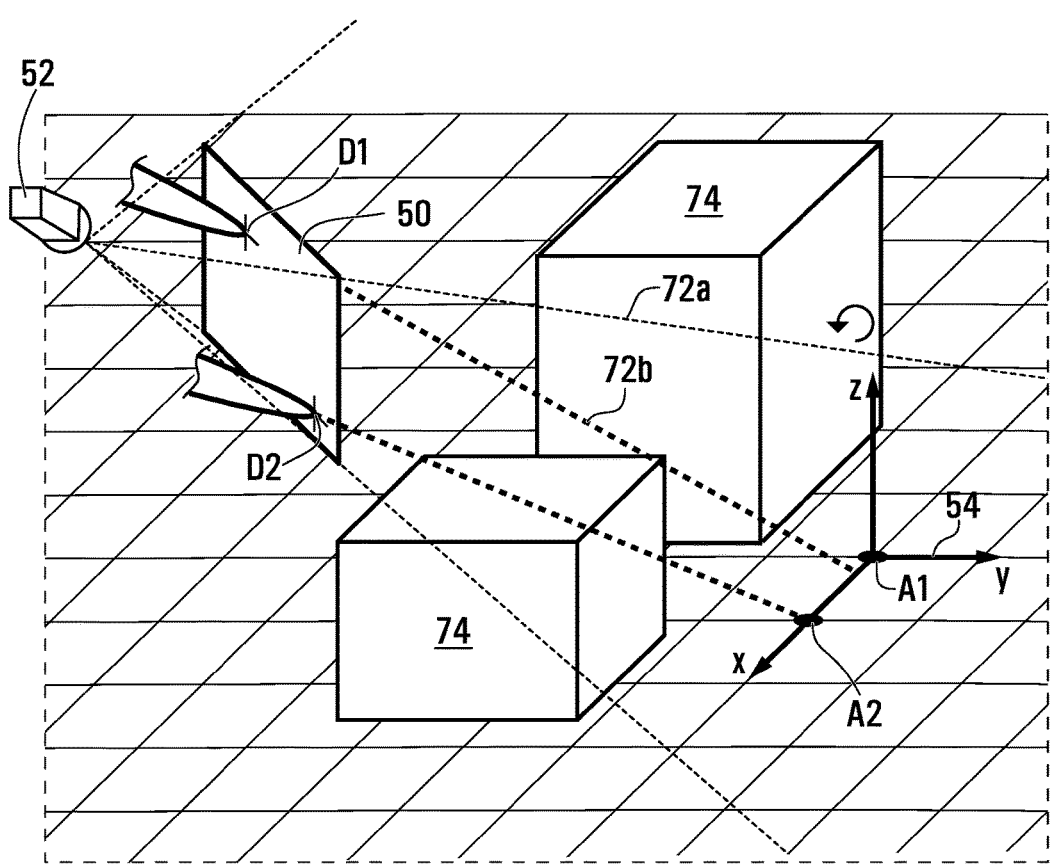
FIG. 14 is the schematic representation of FIG. 9 in an updated configuration.

Referring to FIGS. 13 and 14 another schematic example of portions of a wayfinding system 10 is illustrated. The wayfinding system 10 can then use the methods described herein, such as the method 300 of FIG. 4) to update the position of the virtual camera 52 to update the display provided to the user. Method 300 is generally analogous to method 100, and analogous steps are indicated by like reference characters indexed by 200. In this example, the user touches the display screen 50 with two fingers 56a and 56b, thereby creating two display engagement points D1 and D2. Corresponding model anchor points A1 and A2 are then generated (steps 302-306) as:

$$w_1 = (T_0^{-1} P_0)^{-1} s_{01}$$

$$w_2 = (T_0^{-1} P_0)^{-1} s_{02}$$

When movement of either D1 or D2, or both as illustrated, is detected, the system of equations, including $S1 = ((T_1 M)^{-1} P_1) w_1$ and $S2 = ((T_1 M)^{-1} P_1) w_2$ can be generated (steps 308-312). In this example, the transformation matrix M, which is constrained to allow translation in the x,y,z axis and rotation about the z axis, can be defined (step 314) as the following 4×4 matrix (where Θ is the angle of rotation about the z axis):

$$M = \begin{matrix} \cos\Theta & \sin\Theta & 0 & 0 \\ -\sin\Theta & \cos\Theta & 0 & 0 \\ 0 & 0 & 1 & 0 \\ x & y & z & 1 \end{matrix}$$

The system of equations can then be solved for "x", "y", "z" and "Θ" above, which can be used to calculate the new virtual camera state information $T_2 = T_1 * M$, and used to update the virtual camera position (steps 316-318).

Figure 15:
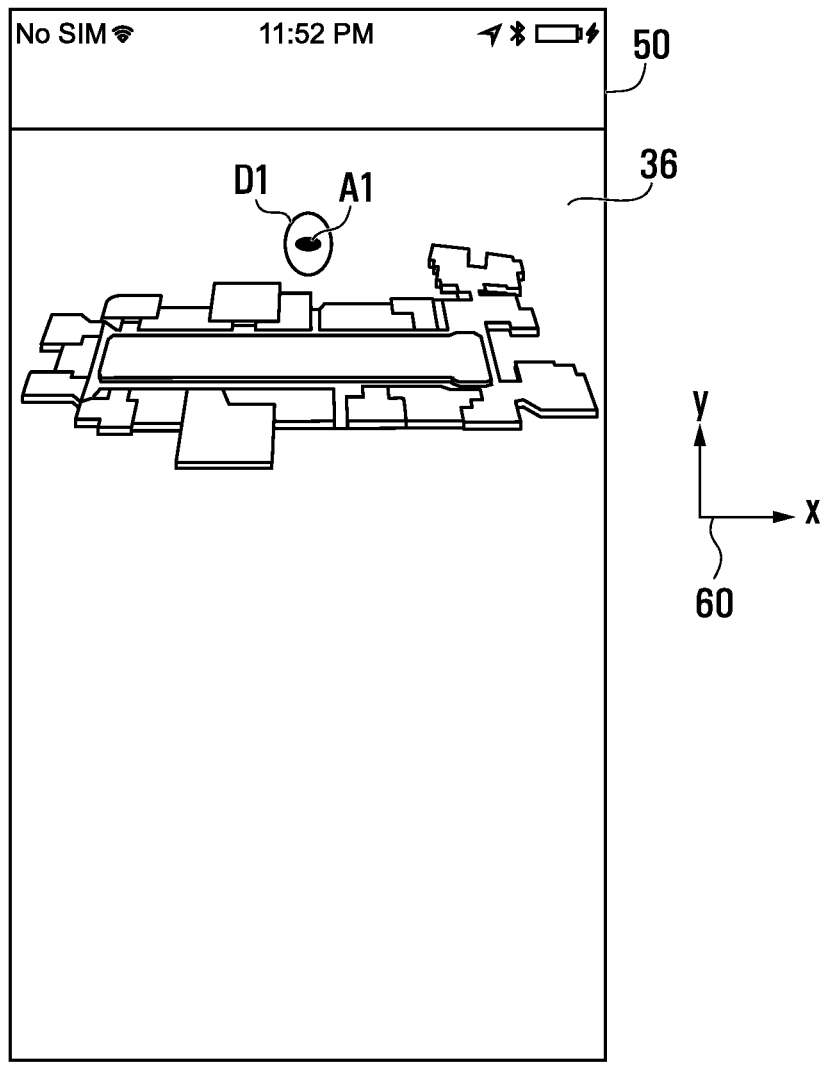
FIG. 15 is a schematic representation of one example of a system that can facilitate the manipulation of a 3D model, in an initial configuration.
Figure 16:
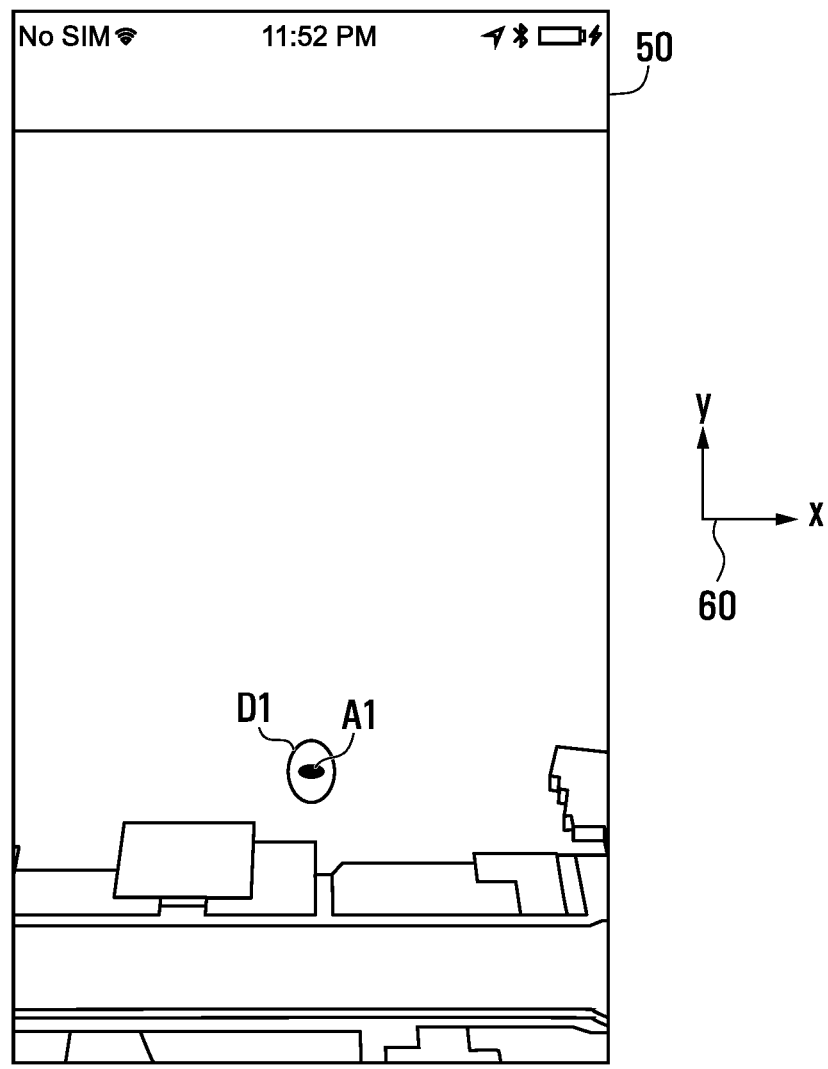
FIG. 16 is the schematic representation of FIG. 15 in an updated configuration.

Referring to FIGS. 15 and 16 another schematic example of portions of a wayfinding system 10 is illustrated. In this example, a touch screen display 50 is illustrated showing a 3D map 36. The location where a user places her finger is shown using a relatively larger dot D, and the underlying anchor point defined by the wayfinding system 10 is shown via smaller dot A. A grid is superimposed on the map 36 to show a grid location for point A, and the user's finger has been omitted from the view to illustrate that point A underlies point D. When the user movers her finger downwardly on the screen as illustrated from FIG. 15 to FIG. 16, the location of the display engagement point D is moved toward the bottom of the screen 50, and the display of the map 36 is updated using the methods herein so that anchor point A remains registered beneath display engagement point D from the user's perspective, and the result appears to the user as a downward translation of the map 36.

Figure 17:
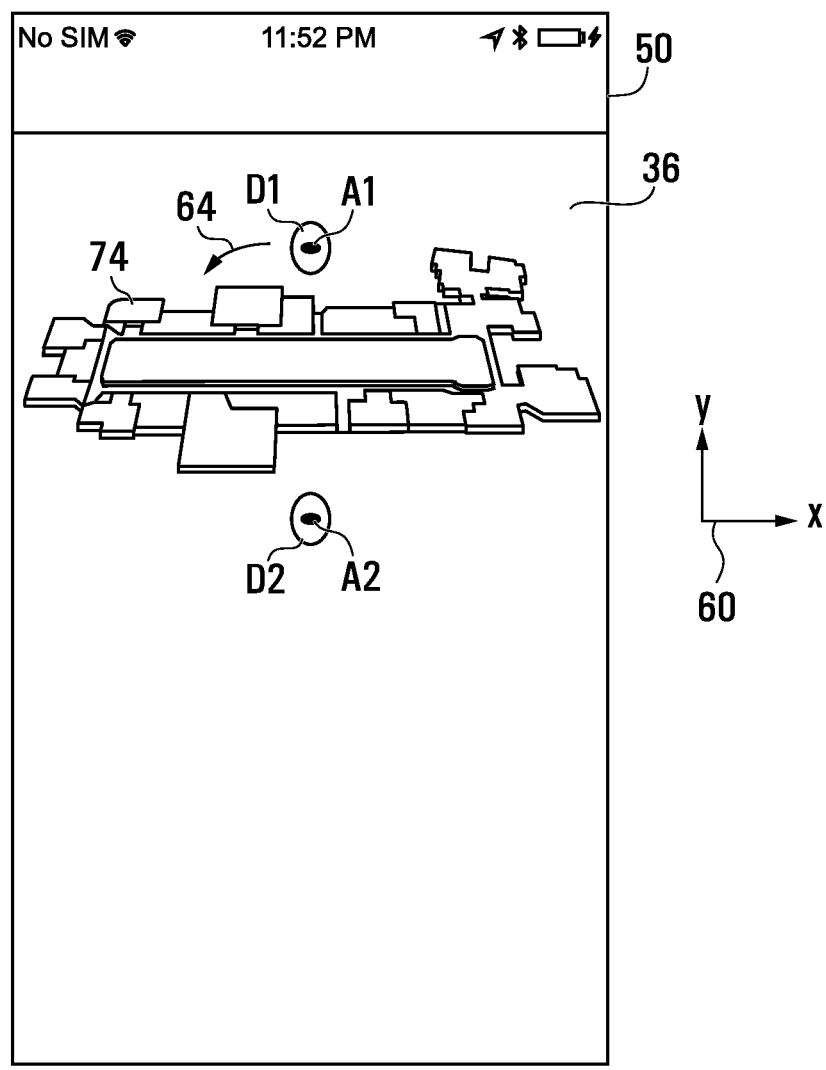
FIG. 17 is a schematic representation of one example of a system that can facilitate the manipulation of a 3D model, in an initial configuration.
Figure 18:
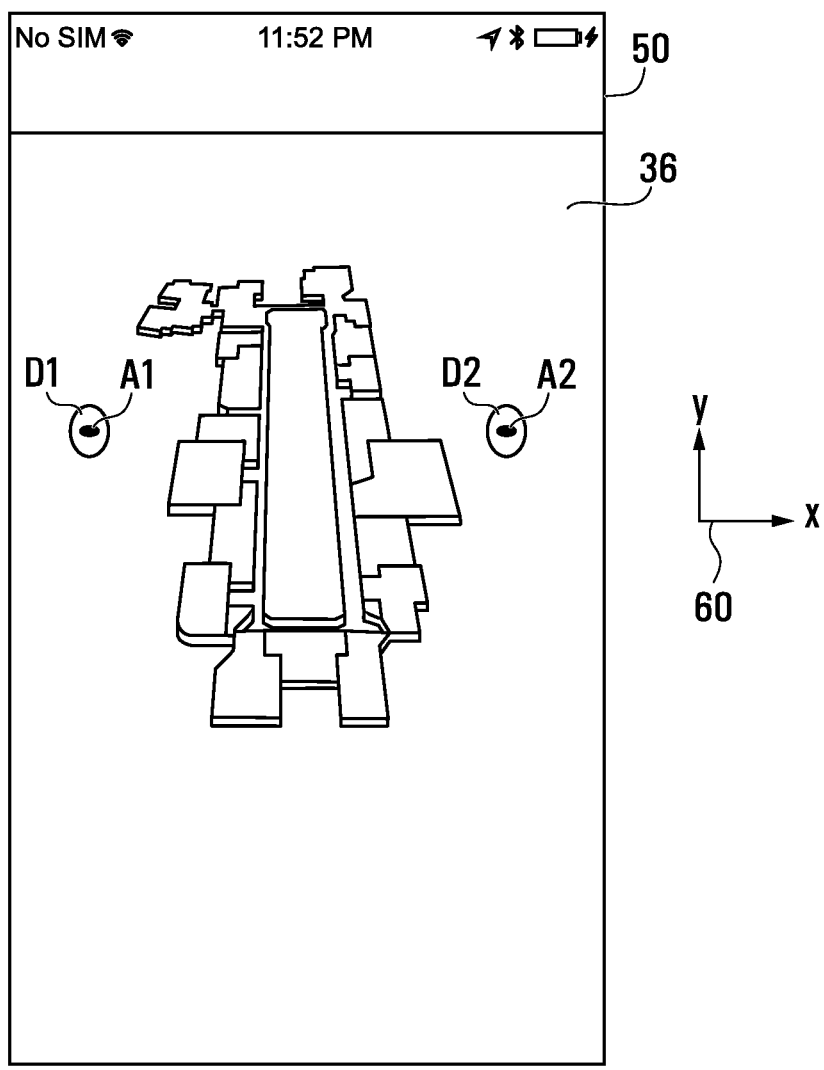
FIG. 18 is the schematic representation of FIG. 17 in an updated configuration.

Referring to FIGS. 17 and 18 another schematic example of portions of a wayfinding system 10 is illustrated. In this example, a user has placed two fingers on the touch screen display 50, and created two display engagement points D1 and D2, and corresponding anchor points A1 and A2. In this example the user moves both fingers across the surface in a generally counter-clockwise arch (see arrow 64), resulting in new D1 and D2 positions relative to the display screen 50 in FIG. 18. When D1 and D2 are moved in this manner, the display is updated so that anchor points A1 and A2 remain registered beneath their respective display engagement points, and the result appears to the user as a generally 90 degree counter-clockwise rotation of the map 36.

Optionally, display engagement points can be moved closer to or away from each other in the display screen 50 co-ordinate system 60. When the method 100 is executed on such changes, the result may appear to be a general "zooming in" or "zooming out" of the display, while the relative distance between the location of the display engagement points on the display co-ordinate system 60 isn't directly utilized to effect this change, which may differ from some known "pinch to zoom" techniques.

Figure 19:
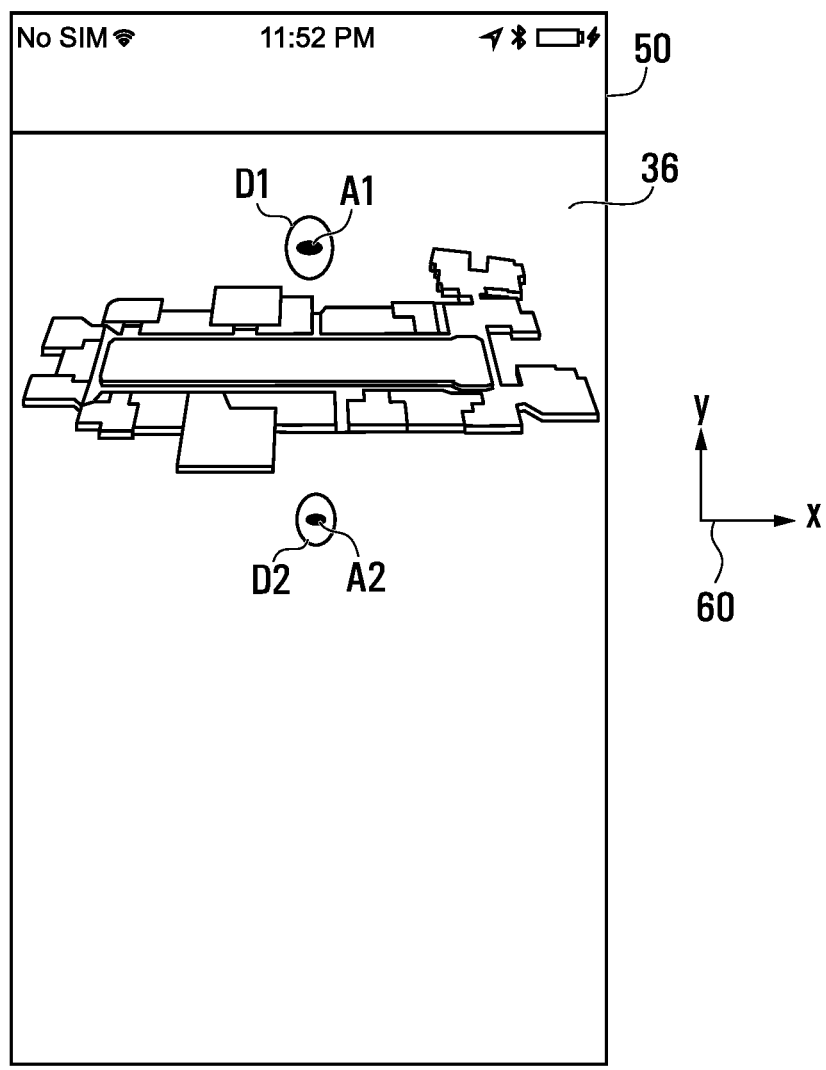
FIG. 19 is a schematic representation of one example of a system that can facilitate the manipulation of a 3D model, in an initial configuration.
Figure 20:
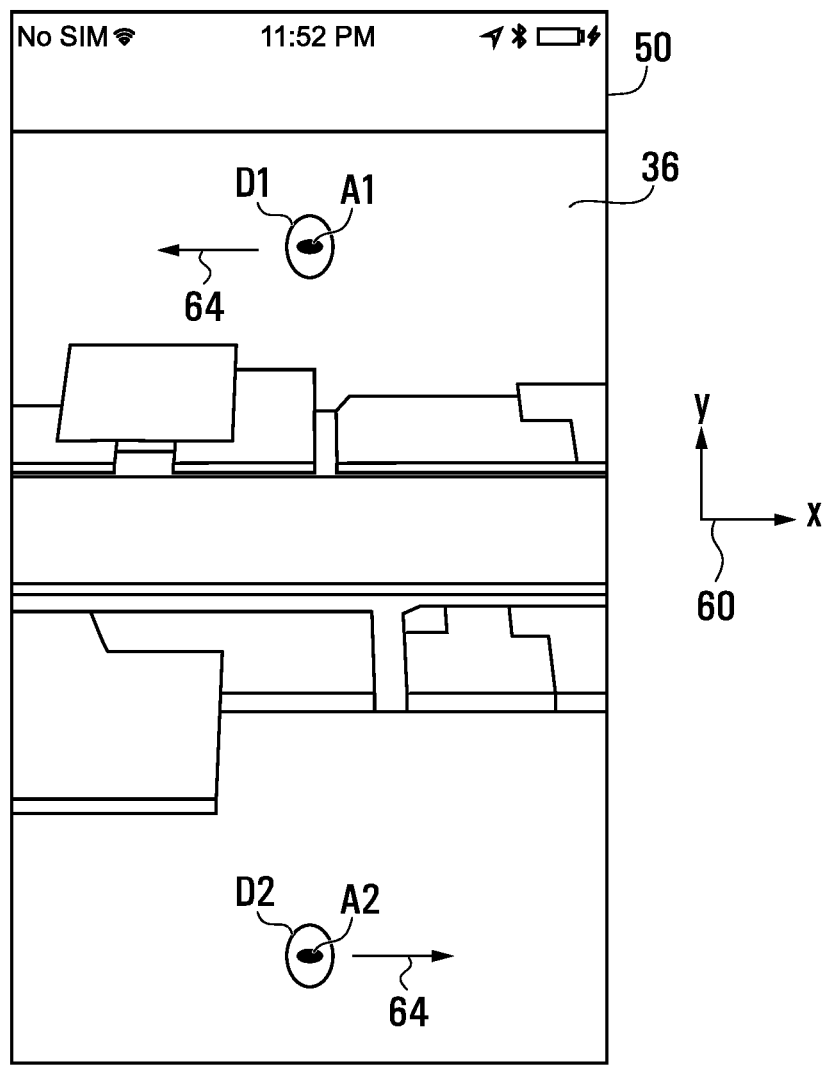
FIG. 20 is the schematic representation of FIG. 19 in an updated configuration.

Referring to FIGS. 19 and 20 another schematic example of portions of a wayfinding system 10 is illustrated. In this example, a user has placed two fingers on the touch screen display 50, and created two display engagement points D1 and D2, and corresponding anchor points A1 and A2. As displayed in FIG. 19, the map 36 is generally zoomed out, such that substantially the entire shopping mall is visible. To change the display, the user may move one finger downwardly (arrow 64), such that D2 is moved toward the bottom of the display screen 50, as shown in FIG. 20. When executing the method 100 to have anchor point A2 remain registered beneath display engagement point D2, the virtual camera may be positioned such that both A1 and A2 remain in the display and this may result in the virtual camera being positioned "closer" to the map 36 and may generate a display that appears "zoomed in" to the user.

Figure 21:
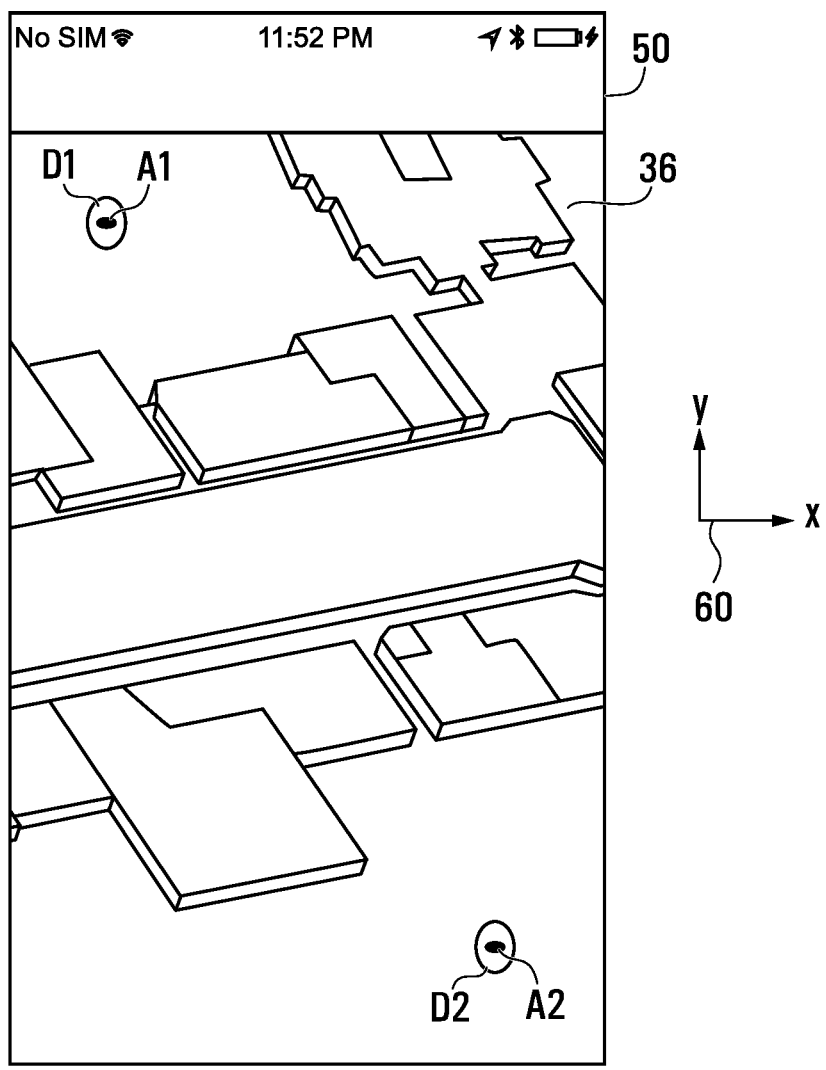
FIG. 21 is the schematic representation of FIG. 20 in a further updated configuration.

Referring also to FIG. 21, the user may then move her fingers to rotate the display, such as by moving her upper finger to the left and her lower finger to the right as illustrated. This may cause points D1 and D2 to shift, and result in corresponding changes to the display to ensure A1 and A2 remain aligned.

While shown in two steps (i.e. FIG. 19 to FIG. 20, and then FIG. 20 to FIG. 21), the changes in the display may be achieved in a generally continuous user action. For example, the user may move her fingers from the positions of FIG. 19 directly to the positions of FIG. 21, without needing to stop at the intervening position of FIG. 21. Using the method 100, a change from the positions of FIG. 19 to the positions of FIG. 21 may be resolved in a single transformation (i.e. a single use of the method 100 and a single matrix M) rather than having to solve separate "zoom" and "rotation" steps.

Optionally, a wayfinding system 10 may be configured to detect and process user display inputs (i.e. touches on a touch screen) using any suitable method/mechanism and provide such inputs to the methods described herein. In some embodiments, the wayfinding system 10 may be configured to accept up to two simultaneous touches (or other such inputs), and may include the controller 300 of FIG. 8.

Figure 6:
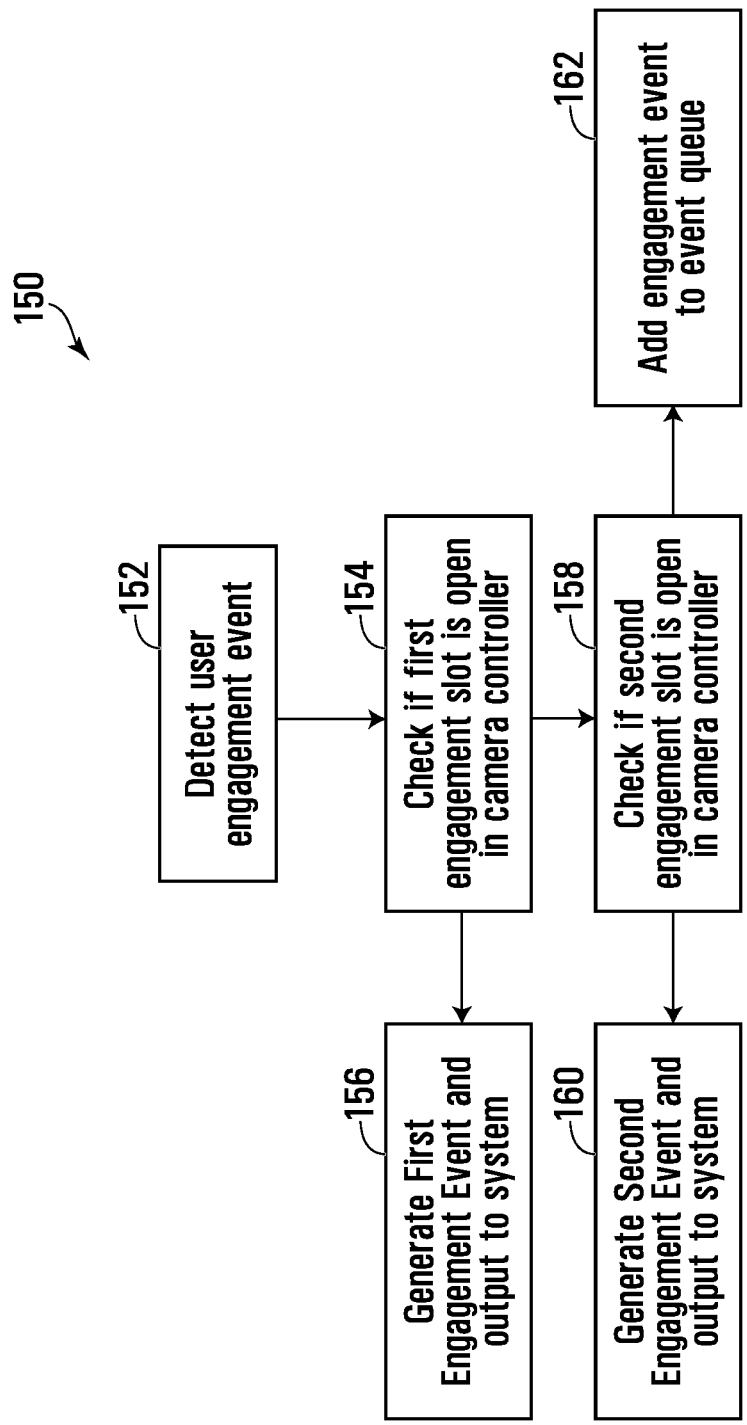
FIG. 6 is a schematic representation of one example of a method of detecting the start of an engagement event.

One example of a method 150 for detecting the start of such inputs (i.e. detecting when a user touches the display screen 50) is illustrated in FIG. 6. In this example, the system may detect a new user engagement event, such as a new "touch" event in the present examples (step 152). The system can then check the user engagement module 302 to determine if the first engagement slot 304a is open. If so, the newly detected touch event can be stored in the first engagement slot 304a and its position can be noted to generate a first display engagement point (step 156). If the first engagement slot 304a is occupied (i.e. there is already one finger touching the screen), the system can check if the second engagement slot 304b is available (step 158).

If so, the newly detected touch event can be stored in the second engagement slot 304b and its position can be noted to generate a second display engagement point (step 160). If the second engagement slot 304b is also occupied (i.e. there are already two fingers touching the screen), the new touch event can be stored in an engagement event queue (step 162).

Optionally, the wayfinding system 10 may periodically check the status of the user input engagement events to determine if they are still active. For example, the system may periodically check to determine if a user is still touching the display screen 50, and/or is touching the display screen in the same manner. For example, the wayfinding system 10 may want to determine if a user has lifted a finger off the screen, and the like and may consider this the end of a given engagement event (i.e. the end of a touch event).

Figure 7:
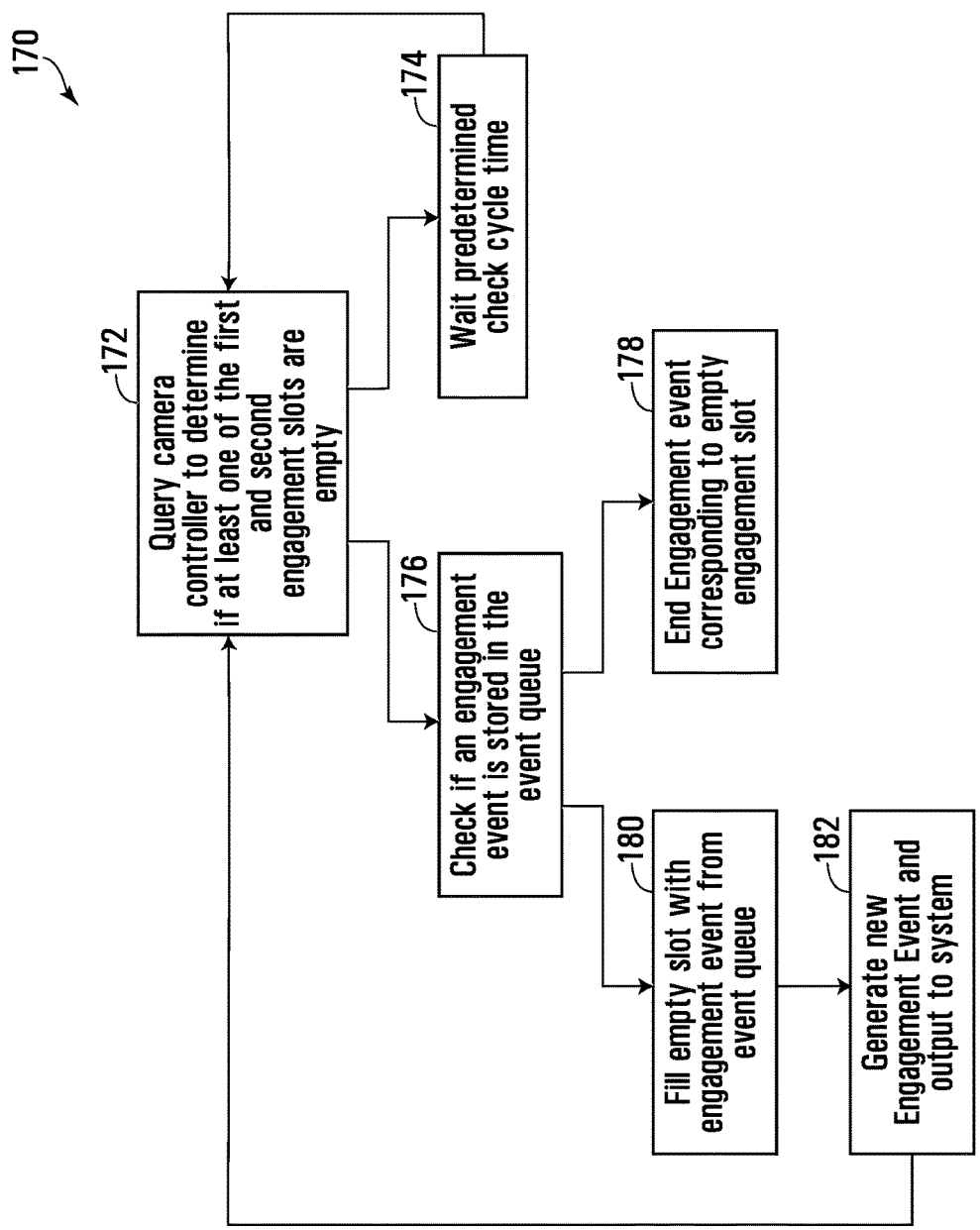
FIG. 7 is a schematic representation of one example of a method of detecting the end of an engagement event.

One example of method 170 that may be used by the wayfinding system 10 to check for the end of engagement events is shown in FIG. 7. In this example, the wayfinding system 10 can query the camera controller 300 to determine if at least one of the engagement slots 304a and 304b is empty (step 172). If not, the system may wait a predetermined wait time (between about 0.1 and about 0.001 seconds, for example) and then restart the method (step 174).

If at least one of the engagement slots 304a and 304b is empty, the system can then check if any events are waiting in the event queue (step 176). If the engagement queue is empty the system may then (at step 178) end the engagement event corresponding to the empty engagement slot. That is, the system may determine that the user is no longer touching the screen and remove the display engagement point.

Alternatively, if there is an engagement event in the event queue, the system may (step 180) fill the empty engagement slot 304a or 304b with the stored engagement event, which may essentially replace the an initial display engagement point with a new display engagement point and provide updated engagement point location data to the system (step 182).

For example, a user may have placed two fingers on the screen, thereby filling the engagement slots 304a and 304b. If a user simply lifts one of the fingers, the system may notice that one engagement slot is now empty, and may signal the end of the given touch event (steps 72, 176, 178).

However, if a user had placed two fingers on the screen, thereby filling the engagement slots 304*a* and 304*b*, and then simultaneously placed a third finger on the screen the presence of the third touch event would be stored in the event queue. If the user then subsequently the "second" one of the original two fingers, the system may detect the absence of the second finger (steps 172 and 176) but could then insert the location of the third finger to replace the lifted second finger (step 180). The system could then update the display engagement point information such that the first display engagement point corresponds to the location of the first finger, and the second engagement display point corresponds to the location of the third finger.

Optionally, instead of using polling techniques, including those described herein, the wayfinding system 10 may be configured such that the method 100 is triggered using any suitable push mechanism. For example, the wayfinding system 10 may be configured such that the method 100 (or any portions thereof) is triggered by changes in the touch points (or other user display engagement points) or any other suitable, pre-determined triggering event.

While the above description provides examples of one or more apparatus, methods, or systems, it will be appreciated that other apparatus, methods, or systems may be within the scope of the claims as interpreted by one of skill in the art.

What is claimed is:

1. A method for manipulating a 3D model displayed on a display, the method comprising:
   detecting one or more display engagement events from a user touch input;
   determining a location of each display engagement event to generate a corresponding display engagement point;
   capturing virtual camera state information of a virtual camera;
   generating and storing a model anchor point for each display engagement point;
   detecting movement of the display engagement point and capturing an updated display engagement point; and
   generating a transformation matrix including updated virtual camera state information; and
   wherein the virtual camera state information is stored as an affine transform matrix and a non-affine perspective matrix.

2. The method of claim 1 further comprising:
   where only one display engagement point is provided, constraining traits of the transformation matrix so the transformation is limited to a translation in a x-y plane of a model coordinate system; and
   where two display engagement points are provided, constraining traits of the transformation matrix so the transformation is limited to a translation in the x, y, and z axis axes of the model coordinate system and rotation about the model coordinate system's z axis.

3. The method of claim 1, wherein the virtual camera state information includes virtual camera position and orientation, and wherein the virtual camera position includes X, Y, and Z position values, and the virtual camera orientation includes rotation values about the model coordinate system's x, y, and z axes.

4. The method of claim 3 further comprising:
   detecting a single user touch input;
   updating the virtual camera position values X, and Y; and
   fixing the virtual camera position value Z and the virtual camera orientation.

5. The method of claim 3 further comprising:
   detecting a first user touch input and a second user touch input;
   updating the virtual camera position values X, Y, Z, and the rotation values of the virtual camera orientation about the model coordinate system's Z axis; and
   fixing the rotation values of the virtual camera orientation about the model coordinate system's X and Y axes.

6. The method of claim 1 further comprising:
   displaying a 3D map on a touchscreen display;
   detecting the display engagement events from a user touch input on the touchscreen display; and
   displaying, on the touchscreen display, an updated 3D map based on updated virtual camera position and orientation.

7. The method of claim 1, wherein the model anchor point is stored in the model coordinate system, and wherein the display engagement event location is stored in a display coordinate system.

8. The method of claim 1 further comprising applying a hit test algorithm for a given display engagement point and capturing camera state values of the virtual camera when the display engagement point is initially created.

9. The method of claim 1 further comprising capturing the virtual camera state information at a different time to provide an updated affine transform matrix.

10. A system for manipulating a 3D model, the system comprising:
    a user input configured to detect one or more display engagement events from a user touch input, and detect movement of a display engagement point and capturing an updated display engagement point; and
    a camera controller configured to determine a location of each display engagement event to generate a corresponding display engagement point, capture virtual camera state information of a virtual camera, generate and store a model anchor point for each display engagement point, and generate a transformation matrix including updated virtual camera state information; and
    wherein the virtual camera state information is stored as an affine transform matrix and a non-affine perspective matrix.

11. The system of claim 10 wherein, where only one display engagement point is provided, the camera controller constrains traits of the transformation matrix so the transformation is limited to a translation in a x-y plane of a model coordinate system; and
    wherein, where two display engagement points are provided, the camera controller constrains traits of the transformation matrix so the transformation is limited to a translation in the x, y, and z axis axes of the model coordinate system and rotation about the model coordinate system's z axis.

12. The system of claim 10, wherein the virtual camera state information includes virtual camera position and orientation, and wherein the virtual camera position includes X, Y, and Z position values, and the virtual camera orientation includes rotation values about the model coordinate system's x, y, and z axes.

13. The system of claim 12, wherein the user input detects a single user touch input, and the camera controller updates the virtual camera position values X, and Y, and fixes the virtual camera position value Z and the virtual camera orientation.

14. The system of claim 12, wherein the user input detects a first user touch input and a second user touch input, and the camera controller updates the virtual camera position values X, Y, Z, and the rotation values of the virtual camera orientation about the model coordinate system's Z axis, and fixes the rotation values of the virtual camera orientation about the model coordinate system's X and Y axes.

15. The system of claim 10 further comprising a touch-screen display configured to display a 3D map, detect the display engagement events from a user touch input, and display an updated 3D map based on updated virtual camera position and orientation.

16. The system of claim 10, wherein the model anchor point is stored in the model coordinate system, and wherein the display engagement event location is stored in a display coordinate system.

17. The system of claim 10, wherein the camera controller is configured to apply a hit test algorithm for a given display engagement point and capturing camera state values of the virtual camera when the display engagement point is initially created.

18. The system of claim 10, wherein the camera controller is configured to capture the virtual camera state information at a different time to provide an updated affine transform matrix.

* * * * *